United States Patent
Kobashi

(10) Patent No.: US 7,619,194 B2
(45) Date of Patent: Nov. 17, 2009

(54) ELECTRO-OPTICAL DEVICE, SEMICONDUCTOR DEVICE, DISPLAY DEVICE, AND ELECTRONIC APPARATUS HAVING THE DISPLAY DEVICE

(75) Inventor: Yutaka Kobashi, Mizuho (JP)

(73) Assignee: Epson Imaging Devices Corporation, Azumino-shi (JP)

( * ) Notice: Subject to any disclaimer, the term of this patent is extended or adjusted under 35 U.S.C. 154(b) by 0 days.

(21) Appl. No.: 12/010,844

(22) Filed: Jan. 30, 2008

(65) Prior Publication Data

US 2008/0203279 A1    Aug. 28, 2008

(30) Foreign Application Priority Data

Feb. 26, 2007  (JP)  ............... 2007-045048
Feb. 26, 2007  (JP)  ............... 2007-045050

(51) Int. Cl.
  *G02F 1/133* (2006.01)
  *G09F 9/00* (2006.01)
  *G09G 3/20* (2006.01)
(52) U.S. Cl. ............... 250/205; 250/214 AL; 349/61; 345/102; 345/207; 345/690; 345/63
(58) Field of Classification Search ........... 250/205, 250/214 AL, 214 B; 345/207, 690, 63, 102; 349/61
See application file for complete search history.

(56) References Cited

U.S. PATENT DOCUMENTS

| | | | |
|---|---|---|---|
| 6,737,629 B2 * | 5/2004 | Nixon et al. ............. | 250/214 C |
| 6,809,718 B2 * | 10/2004 | Wei et al. ................. | 345/102 |
| 7,064,733 B2 * | 6/2006 | Cok et al. ................. | 345/76 |
| 7,218,048 B2 * | 5/2007 | Choi et al. ............... | 313/504 |
| 2003/0231161 A1 | 12/2003 | Yamaguchi | |
| 2005/0275616 A1 | 12/2005 | Park et al. | |
| 2006/0164408 A1 * | 7/2006 | Nishikawa et al. .......... | 345/207 |
| 2006/0202947 A1 * | 9/2006 | Lee ........................... | 345/102 |
| 2006/0274027 A1 | 12/2006 | Yamaguchi | |
| 2007/0070056 A1 * | 3/2007 | Sato et al. ................. | 345/207 |
| 2008/0173796 A1 * | 7/2008 | Lum et al. ............. | 250/214 AL |
| 2008/0284716 A1 * | 11/2008 | Edwards et al. ............. | 345/102 |
| 2009/0066897 A1 | 3/2009 | Katoh et al. | |
| 2009/0122039 A1 | 5/2009 | Katoh et al. | |

FOREIGN PATENT DOCUMENTS

JP    A-1-143257    6/1989

(Continued)

*Primary Examiner*—John R Lee
(74) *Attorney, Agent, or Firm*—Oliff & Berridge, PLC

(57) ABSTRACT

An electro-optical device includes a panel formed so that an electro-optical material is held between a first substrate and a second substrate, a lighting unit that irradiates light to a surface of the first substrate or the second substrate of the panel, a light detecting portion that detects an illuminance of ambient light, and a light control portion that controls the lighting unit on the basis of result detected by the light detecting portion. The light detecting portion is provided on the first substrate or on the second substrate and includes a first optical sensor, a second optical sensor, a first electrode, a second electrode, and an electric potential applying portion. The first optical sensor is irradiated with ambient light. The second optical sensor is shielded against irradiation of ambient light. The electrodes are configured to overlap the respective optical sensors through an insulating layer.

19 Claims, 22 Drawing Sheets

FOREIGN PATENT DOCUMENTS

| | | |
|---|---|---|
| JP | A-4-254820 | 9/1992 |
| JP | A-11-98394 | 4/1999 |
| JP | A-2004-078160 | 3/2004 |
| JP | A-2005-352490 | 12/2005 |
| JP | 2006-118965 | 5/2006 |
| WO | WO 2006/117956 A1 | 11/2006 |
| WO | WO 2006/118044 A1 | 11/2006 |

* cited by examiner

ELECTRO-OPTICAL DEVICE, SEMICONDUCTOR DEVICE, DISPLAY DEVICE, AND ELECTRONIC APPARATUS HAVING THE DISPLAY DEVICE

BACKGROUND

1. Technical Field

The present invention relates to, for example, an electro-optical device, a semiconductor device, a display device, and an electronic apparatus having the display device.

2. Related Art

In recent years, a technology for mounting an optical sensor function on a display device, particularly, on a liquid crystal display device that uses thin-film transistors has been progressively developed, which is, for example, described in Japanese Unexamined Patent Application Publication No. 2006-118965. Three purposes to mount an optical sensor may be given: (1) measuring ambient light to adjust luminance, or the like, to thereby attempt to reduce power consumption and improve image quality; (2) measuring backlight to adjust luminance and/or chromaticity; and (3) recognizing a position of a finger or a light pen to use a touch key. The optical sensor includes a thin-film transistor, a PIN (p-intrinsic-n) diode, a PN diode, or the like. In any cases, a light receiving portion is formed of a silicon thin film, and, in order not to increase costs for manufacturing, the light receiving portion is desirably manufactured in the same manufacturing process as a silicon thin film that forms switching elements for display. When the optical sensor is formed of a thin-film transistor, a PIN diode, a PN diode, or the like, an electric current that flows through the sensor will be the sum of a photoelectric current that varies with an illuminance of light irradiated and a thermoelectric current that increases exponentially with an absolute temperature of the sensor. For this reason, in order to obtain an appropriate illuminance even at a relatively high temperature, it is necessary to effectively remove the thermoelectric current. Therefore, there is a case where a light shielding sensor that is shielded against light for thermoelectric current reference and a light receiving sensor that is not shielded against light are arranged.

At this time, for the purposes of (1) and (3), it is necessary to shield a side that is opposite to a light incident side of ambient light so that light emitted from a backlight does not enter the sensor. As a light shielding material used against backlight, for the purpose of (1), it is possible to use a metal frame, a light shielding tape, or the like, that constitutes a module when an optical sensor is located at an outer peripheral portion of a display device; however, in recent years, because of restrictions of design, or the like, it is requested to provide an optical sensor as close as possible to a display area, or inside the display area. On the other hand, for the purpose of (3), in view of its function, an optical sensor must be mounted inside the display area. Moreover, for the purpose of (2), however, it is necessary to shield an optical sensor so that ambient light is blocked and does not influence detection of illuminance of the backlight. In response to these requests, it is necessary to provide a light shielding film on the optical sensor.

When a light shielding electrode or a transparent electrode and an optical sensor are arranged so as to overlap each other, a thermoelectric current varies because of electric potential of the light shielding electrode or the transparent electrode. Thus, a thermoelectric current is not removed appropriately. In addition, when a light shielding sensor and a light receiving sensor are arranged in proximity to the display area, light emitted from the display area will partly become stray light to be irradiated to the light receiving sensor and the light shielding sensor, so that a photoelectric current by an amount of the stray light is detected as an error. Moreover, a difference in temperature occurs between the light receiving sensor and the light shielding sensor and, as a result, a thermoelectric current is not uniform. This difference in thermoelectric current is also detected as an error.

SUMMARY

An advantage of some aspects of the invention is that it provides a structure or a circuit that is able to optimize an electric potential applied to a light shielding electrode and a transparent electrode. Another advantage of some aspects of the invention is that it provides an electro-optical device that is provided with a photosensor having high accuracy.

An aspect of the invention provides an electro-optical device. The electro-optical device includes a panel (in the embodiment, a liquid crystal panel 911), a lighting unit (in the embodiment, a backlight unit 926 and a light guide plate 927), a light detecting portion (in the embodiment, a detection circuit 360, a light receiving sensor 350P, and the like), and a light control portion (in the embodiment, a central processing circuit 781 and an external power supply circuit 784). The panel is formed so that an electro-optical material (in the embodiment, a nematic phase liquid crystal material 922) is held between a first substrate and a second substrate. The lighting unit irradiates light to a surface of the first substrate (in the embodiment, an active matrix substrate 101) or the second substrate (in the embodiment, an opposite substrate 912) of the panel. The light detecting portion detects an illuminance of ambient light. The light control portion controls the lighting unit on the basis of result detected by the light detecting portion. The light detecting portion is provided on the first substrate or on the second substrate. The light detecting portion includes a first optical sensor (in the embodiment, a light receiving sensor 350P), a second optical sensor (in the embodiment, a light shielding sensor 350D), a first electrode (in the embodiment, a backlight light shielding electrode 611P and a transparent electrode 612P), a second electrode (in the embodiment, a backlight light shielding electrode 611D and a transparent electrode 612D), and an electric potential applying portion (in the embodiment, a self-correction voltage circuit 361). The first optical sensor is irradiated with ambient light. The second optical sensor is shielded against irradiation of ambient light. The first electrode is configured to overlap the first optical sensor through an insulating layer in plan view. The second electrode is configured to overlap the second optical sensor through an insulating layer in plan view. The electric potential applying portion controls an electric potential of the first electrode (in the embodiment, an electric potential VPBT of a wiring PBT (in the embodiment, 3.6 V)) and an electric potential of the second electrode (in the embodiment, an electric potential VDBT of a wiring DBT (in the embodiment, 1.4 V)). In addition, more specifically, the electric potential applying portion may control the electric potential of the first electrode and/or the electric potential of the second electrode so that the amount of photoelectric current of the first optical sensor and/or the amount of photoelectric current of the second optical sensor becomes substantially a maximum value. In addition, more specifically, one of the first substrate and the second substrate may include a transistor formed thereon (in the embodiment, a sixth N-channel transistor N11, a sixth P-channel transistor P11, a seventh N-channel transistor N21, and a seventh P-channel transistor P21), wherein the electric potential applying portion controls the electric potential applied to the first electrode and/or the electric potential applied to the second electrode on the basis of a threshold voltage of the transistor (in the embodiment, Vth).

Another aspect of the invention provides a semiconductor device formed on a substrate. The semiconductor device includes a first optical sensor (in the embodiment, a light receiving sensor 350P), a second optical sensor (in the embodiment, a light shielding sensor 350D), a first electrode (in the embodiment, a backlight light shielding electrode 611P and a transparent electrode 612P), a second electrode (in the embodiment, a backlight light shielding electrode 611D and a transparent electrode 612D), and an electric potential applying portion (in the embodiment, a self-correction voltage circuit 361). The first optical sensor is irradiated with ambient light. The second optical sensor is shielded against irradiation of ambient light. The first electrode is configured to overlap the first optical sensor through an insulating layer in plan view. The second electrode is configured to overlap the second optical sensor through an insulating layer in plan view. The electric potential applying portion applies the first electrode and the second electrode with an electric potential (in the embodiment, an electric potential VPBT of a wiring PBT (in the embodiment, 3.6 V) and an electric potential VDBT of a wiring DBT (in the embodiment, 1.4 V)) at which the amount of photoelectric current of the first optical sensor and/or the second optical sensor is substantially a maximum value. In an existing art, the electric potential of the first electrode is made equal to the electric potential of the second electrode, and the first electrode and the second electrode are typically made into a floating state or connected to GND of a module; however, when configured above, the electric potential may be optimized so that the thermoelectric current of the first optical sensor is equal to the thermoelectric current of the second optical sensor.

In addition, more specifically, the first optical sensor (in the embodiment, 350P) may be a photodiode (in the embodiment, 350P-1), and the second optical sensor (in the embodiment, 350D) may be a photodiode (in the embodiment, 350D-1), and, where a difference in electric potential between a cathode electrode (in the embodiment, 350P-1N) of the first optical sensor and the first electrode (in the embodiment, a backlight light shielding electrode 611P and a transparent electrode 612P) is V1, a difference in electric potential between the cathode electrode (in the embodiment, 350P-1N) of the first optical sensor and an anode electrode (in the embodiment, 350P-1P) of the first optical sensor is VD1, a difference in electric potential between a cathode electrode (in the embodiment, 350D-1N) of the second optical sensor and the second electrode (in the embodiment, a backlight light shielding electrode 611D and a transparent electrode 612D) is V2, and a difference in electric potential between the cathode electrode (in the embodiment, 350D-1N) of the second optical sensor and an anode electrode (in the embodiment, 350D-1P) of the second optical sensor is VD2, |V1−V2|<|VD1| and |V1−V2|<|VD2| may be established, and, more desirably, |V1−V2|<1 V may be established. By setting the electric potentials as described above, it is possible to mostly ignore a difference in thermoelectric current between the first optical sensor and the second optical sensor.

Furthermore, the semiconductor device may be set to any one of V1=0 V, V2=0 V, V1=VD1, and V2=VD2. That is, by connecting the first electrode to any one of the cathode electrode, source electrode, anode electrode and drain electrode of the first optical sensor or by connecting the second electrode to any one of the cathode electrode, source electrode, anode electrode and drain electrode of the second optical sensor, it is possible to mostly eliminate a difference in thermoelectric current of the first optical sensor and the second optical sensor and also possible to make the number of wirings be minimum.

Here, in the aspect of the invention, the semiconductor device may be configured so that the first electrode is a first light shielding electrode (in the embodiment, a backlight light shielding electrode 611P) that shields light and the second electrode is a second light shielding electrode (in the embodiment, a backlight light shielding electrode 611D) that shields light, or the first electrode is a first transparent electrode (in the embodiment, a transparent electrode 612P) that does not shield light and the second electrode is a second transparent electrode (in the embodiment, a transparent electrode 612D) that does not shield light, or the first electrode is a first light shielding electrode that shields light and a first transparent electrode that does not shield light and the second electrode is a second light shielding electrode that shields light and a second transparent electrode that does not shield light. In this manner, when a light shielding electrode that shields light traveling from an extra direction and/or a transparent electrode that passes light traveling from an incident direction and functions as an electromagnetic noise shield are superimposed on an optical sensor, if the electric potential is set as described above, the detection accuracy is not lowered.

Moreover, in the aspect of the invention, the semiconductor device may be configured so that the first light shielding electrode and the second light shielding electrode form a light shielding electrode gap region in between, in which no light shielding electrode is formed in the light shielding electrode gap region, and an opaque gap light shielding body is formed in a region that overlaps the light shielding electrode gap region. Thus, in order to apply the first light shielding electrode and the second light shielding electrode with separate electric potentials, it is necessary to provide a light shielding electrode gap region on the light shielding electrodes; however, when light emitted from the backlight enters through the gap and multiply scatters on the surface of a glass or dielectric to become stray light to finally enter the first optical sensor or the second optical sensor, the detection accuracy is lowered. Then, by forming an opaque gap light shielding body in a region that overlaps the light shielding electrode gap region, it is possible to absorb light that enters through the light shielding electrode gap region by a gap light shielding body, and thereby possible to avoid the above described decrease in accuracy. Furthermore, in the aspect of the invention, the semiconductor device may be configured so that the first light shielding electrode and the second light shielding electrode form a light shielding electrode gap region (in the embodiment, 611G) in between, in which no light shielding electrode is formed in the light shielding electrode gap region, wherein the first transparent electrode and the second transparent electrode form a transparent electrode gap region (in the embodiment, 612G) in between, in which no transparent electrode is formed in the transparent electrode gap region, and wherein the light shielding electrode gap region and the transparent electrode gap region are formed so as not to overlap each other in a vertical direction of the substrate. Thus, in order to apply separate electric potentials, it is necessary to provide the light shielding electrodes with the light shielding electrode gap region, and to provide the transparent electrodes with the transparent electrode gap region; however, when electromagnetic noise enters through these gaps, the detection accuracy of the sensors is lowered. Then, when the light shielding electrode gap region and the transparent electrode gap region are arranged so as not to overlap each other, any one of the electrodes is able to shield electromagnetic noise that enters through the respective gaps. Hence, in comparison with the case where the light shielding electrode gap region and the transparent electrode gap region are formed at the same position, the detection accuracy is improved.

Furthermore, in the aspect of the invention, the semiconductor device may be configured so that the first light shielding electrode and the first transparent electrode are applied with the same electric potential, and the second light shielding electrode and the second transparent electrode are applied with the same electric potential. With the above configuration, because electric potentials applied to the light shielding electrode and the transparent electrode may be supplied through the same wiring, it is possible to reduce the number of wirings, the number of mounting terminals, and an area of circuit. In addition, because the total capacitance of the light shielding electrode and the transparent electrode increases, the electromagnetic shielding performance is improved. Moreover, in the aspect of the invention, the semiconductor device may be configured so that the electric potential applying portion is provided with a self-correction voltage circuit formed of a transistor, the self-correction voltage circuit is configured to output a voltage, which varies in response to a threshold value of the transistor, to the first electrode and/or the second electrode. Production tolerance in optimum electric potential of a light shielding electrode or transparent electrode that is able to obtain a maximum photoelectric current correlates with production tolerance in threshold voltage (Vth) of transistors when the transistors are formed on the same semiconductor device. Thus, when the self-correction voltage circuit that outputs a voltage varying in response to a threshold voltage of a transistor is used, it is possible to always apply an optimum electric potential to a light shielding electrode or a transparent electrode even when there is a production tolerance.

In addition, in the aspect of the invention, the first optical sensor and the second optical sensor each may be a PIN junction diode or PN junction diode that uses thin-film polysilicon. The above diode has advantage in that it may be formed on a semiconductor device that uses a polysilicon thin-film transistor without any additional manufacturing process; however, a ratio of a thermoelectric current to a photoelectric current is larger than that of a photosensor, or the like, formed on a single-crystal wafer and, in addition, a thermoelectric current easily varies because of an electric potential applied by an electrode overlapped in plan view, so that it is suitable for applying the aspect of the invention. Yet another aspect of the invention provides an electro-optical device. The electro-optical device includes a panel (in the embodiment, a liquid crystal panel 911) and a light detecting portion (in the embodiment, a detection circuit 360, a light receiving sensor 350P, and the like). The panel is configured so that an electro-optical material (in the embodiment, a nematic phase liquid crystal material 922) is held between a first substrate and a second substrate. A display area is formed in the panel. The light detecting portion detects an illuminance of ambient light around the panel. The light detecting portion is provided at a peripheral portion of the display area of the first substrate or the second substrate. The light detecting portion includes a plurality of first optical sensors (a light receiving sensor 350P) and a plurality of second optical sensors (in the embodiment, a light shielding sensor 350D). The first optical sensors are irradiated with ambient light. The second optical sensors are shielded against irradiation of ambient light. The plurality of first optical sensors and the plurality of second optical sensors are provided at the peripheral portion of the display area. As arranged above, it is possible to prevent an extreme change in detection result due to a finger or small shadow while, at the same time, it is possible to prevent a decrease in accuracy because of a difference in thermoelectric current due to temperature distribution in the device. In addition, in the aspect of the invention, the electro-optical device may further include a light source (in the embodiment, a backlight unit 926) that irradiates light to the display area of the panel, wherein the light source is arranged at a side of the peripheral portion of the display area, at which the first optical sensors and the second optical sensors are not arranged. As the thus configured, because it is possible to maximally reduce a difference in thermoelectric current generated between the first optical sensors and the second optical sensors owing to thermal gradient due to the light source, it is possible to accurately exclude thermoelectric current. In addition, in the aspect of the invention, the electro-optical device may be configured so that the first optical sensors and the second optical sensors are alternately arranged with each other. As arranged above, even when there is a thermal distribution in the display device, the average temperature of the first optical sensors does not largely differ from the average temperature of the second optical sensors, so that it is possible to further accurately exclude thermoelectric current. In addition, in the aspect of the invention, the electro-optical device may be configured so that the first optical sensors and the second optical sensors that are arranged adjacent to the first optical sensors are located substantially the same distance from the boundary side (in the embodiment, the dotted line that indicates the boundary side of the display area 310) of the display area. As arranged above, so-called stray light, which is generated when light emitted from the display area is reflected multiple times on the interface of a glass substrate or an insulating layer, is irradiated uniformly to the first optical sensors and to the second optical sensors, so that, by taking a difference in electric current between the first optical sensors and the second optical sensors, there is no decrease in accuracy due to the stray light. In addition, in the aspect of the invention, the electro-optical device may be configured so that the size of a plurality of opening portions (in the embodiment, light receiving opening portions 990-1 to 990-10), which are provided in the first substrate or in the second substrate to irradiate ambient light around the panel to the first optical sensors is set to a range of 0.5 mm to 20 mm in a direction parallel to the boundary side of the peripheral portion of the display area, at which the opening portions are arranged, and to a range of 0.05 mm to a thickness of the substrate, which is provided with the opening portions, in a direction perpendicular to the boundary side of the peripheral portion of the display area, at which the opening portions are arranged. When the opening portions are thus set, stray light is reduced and a difference in thermoelectric current due to thermal distribution in the device is also reduced, so that it is possible to prevent a decrease in detection accuracy. In addition, in the aspect of the invention, the electro-optical device may be configured so that the plurality of opening portions include, at the peripheral portion of the display area, at least one first opening portion (in the embodiment, light receiving opening portions 990-1 to 990-6) that is arranged at a side opposite an arranged side at which the light source is arranged and at least one second opening portion (in the embodiment, light receiving opening portions 990-7 to 990-10) that is arranged at a side that is substantially perpendicular to the arranged side, wherein an area of opening of the at least one first opening portion is greater than an area of opening of the at least one second opening portion. Furthermore, when the thermal gradient differs depending on a position at which the opening portion is arranged, the size of the opening portion is reduced as the thermal gradient increases, it is possible to reduce the influence of thermal gradient. More specifically, a display device may be configured so that a side adjacent to the at least one first opening portion among the four sides of the display area and a side adjacent to the at least one second opening portion among the four sides of the display area are different from each other. It is only necessary to further reduce the size of the opening portion when the opening portion is arranged at a side that has an abrupt thermal gradient.

In addition, another aspect of the invention provides a display device that uses the above described semiconductor device. In this manner, without increasing manufacturing costs, it is possible to improve the temperature dependency of a photosensor provided on the display device, and it is also possible to, independently of temperature, perform display setting in response to ambient light environment. Thus, it is possible to arrange the photosensor extremely in proximity to the display area.

In addition, yet another aspect of the invention provides an electronic apparatus that uses the above described display device. According to this, for example, in an electronic apparatus, such as a digital still camera, a cellular phone, or a PDA (Personal Digital Assistant), backlight may be easily controlled in response to ambient light because an optical sensor that has a high detection accuracy independent of temperature is mounted therein, useless power consumption is not increased, and costs are not increased. In addition, because a photosensor is arranged in proximity to the display area, flexibility of design is improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of an electro-optical device, a semiconductor device, a display device and an electronic apparatus having the display device according to the invention will be described with reference to the accompanying drawings.

First Embodiment

Figure 1:
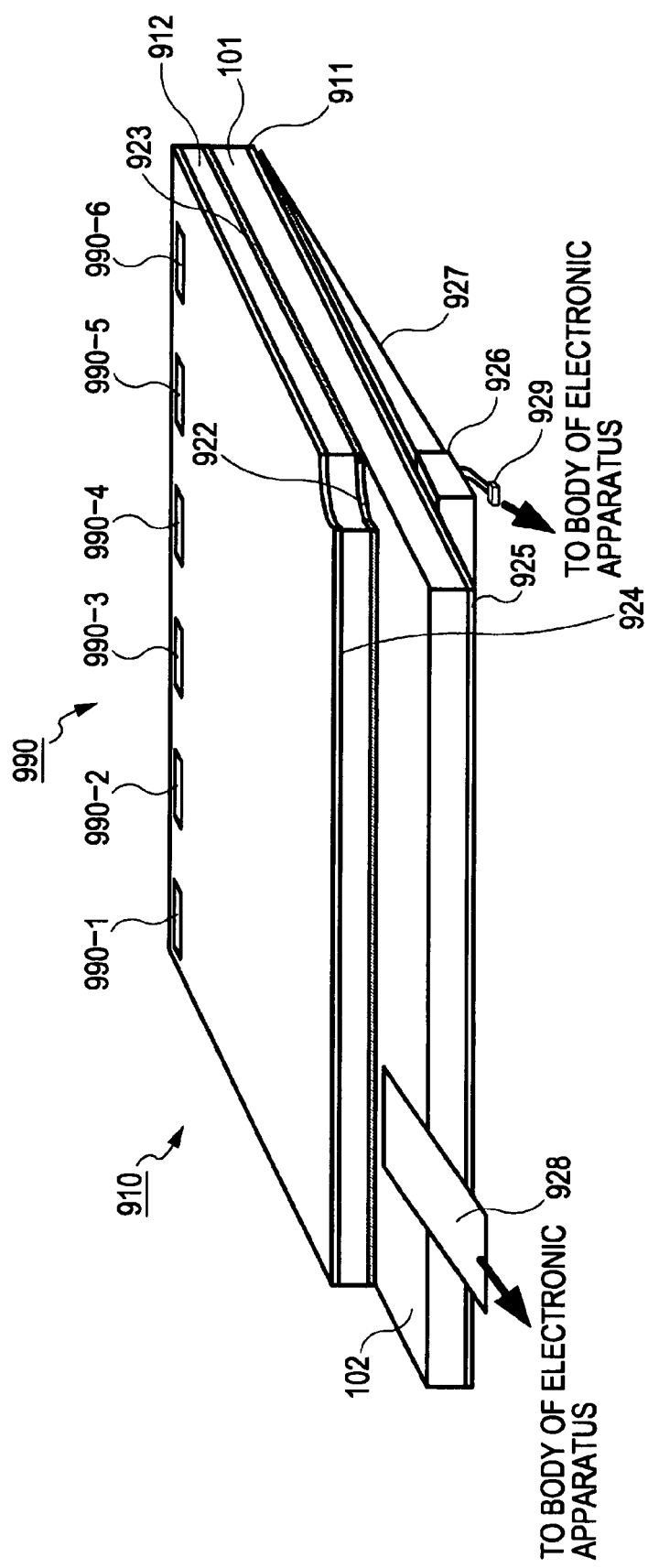
FIG. 1 is a perspective view of a liquid crystal display device according to an embodiment of the invention.

FIG. 1 is a perspective configuration diagram (partly cross-sectional view) of a liquid crystal display device 910 according to the embodiment of the invention. The liquid crystal display device 910 includes an active matrix substrate 101 and an opposite substrate 912, which are adhered to each other at a prescribed interval by a seal material 923, and also includes a liquid crystal panel 911 that holds a nematic phase liquid crystal material 922. An alignment layer (not shown) is formed on the active matrix substrate 101 in such a manner that an alignment material formed of polyimide is applied and a rubbing process is then performed on the alignment material. On the other hand, on the opposite substrate 912, color filters (not shown), a black matrix 940, and an opposite electrode 930 are formed. The color filters are formed at positions corresponding to pixels. The black matrix 940 is formed of resin having a low reflectivity and a low transmittance ratio and prevents light transmission. The opposite electrode 930 is formed of ITO film and is supplied with a common electric potential while being short-circuited with opposite conducting portions 330-1 to 330-2 formed on the active matrix substrate 101. An alignment material, which is formed of polyimide, is applied on a surface that contacts the nematic phase liquid crystal material 922, and a rubbing process is performed in a direction perpendicular to the rubbing process of the alignment layer formed on the active matrix substrate 101.

Moreover, an upper polarizer 924 is arranged outside the opposite substrate 912, and a lower polarizer 925 is arranged outside the active matrix substrate 101. Then, both the polarization directions are placed perpendicularly (crossed-Nichols) to each other. Furthermore, a backlight unit 926 and a light guide plate 927 are arranged below the lower polarizer 925. Light is irradiated from the backlight unit 926 toward the light guide plate 927, and the light guide plate 927 reflects or refracts light emitted from the backlight unit 926 so that it becomes a uniform planar light source perpendicularly toward the active matrix substrate 101. Thus, the backlight unit 926 and the light guide plate 927 function as a light source of the liquid crystal display device 910. The backlight unit 926 is an LED unit in this embodiment; however, it may be a cold cathode fluorescent lamp (CCFL). The backlight unit 926 is connected through a connector 929 to a body of an electronic apparatus and is supplied with power; however, in this embodiment, the amount of light emitted from the backlight unit 926 is adjusted by adjusting power to an appropriate electric current and voltage if necessary.

Although not shown in the drawing, furthermore, if necessary, an outer casing may be provided to cover the liquid crystal display device 910, or a protection glass or acrylic plate may be attached further above the upper polarizer 924 or an optical compensation film may be adhered to improve viewing angle.

In addition, light receiving opening portions 990 of optical sensors are provided at outer peripheral portions of the liquid crystal display device 910. Moreover, the active matrix substrate 101 is provided with an extended portion 102 that extends outside relative to the opposite substrate 912, and an FPC (flexible printed circuit) board 928 is mounted so as to be electrically connected to a signal input terminal 320, which is provided on the extended portion 102. The FPC (flexible printed circuit) board 928 is connected to the body of the electronic apparatus and is supplied with necessary power, control signals, and the like.

Furthermore, the light receiving opening portions 990-1 to 990-6 of six optical sensors are provided on the liquid crystal display device 910. These light receiving opening portions 990-1 to 990-6 are formed by partly removing the black matrix 940 formed on the opposite electrode 930 and, thereby, ambient light is allowed to reach the active matrix substrate 101. The black matrix 940 formed on the opposite electrode 930 is not removed around each of the light receiving opening portions 990-1 to 990-6, and, thereby, ambient light is not allowed to reach the active matrix substrate 101.

Figure 2:
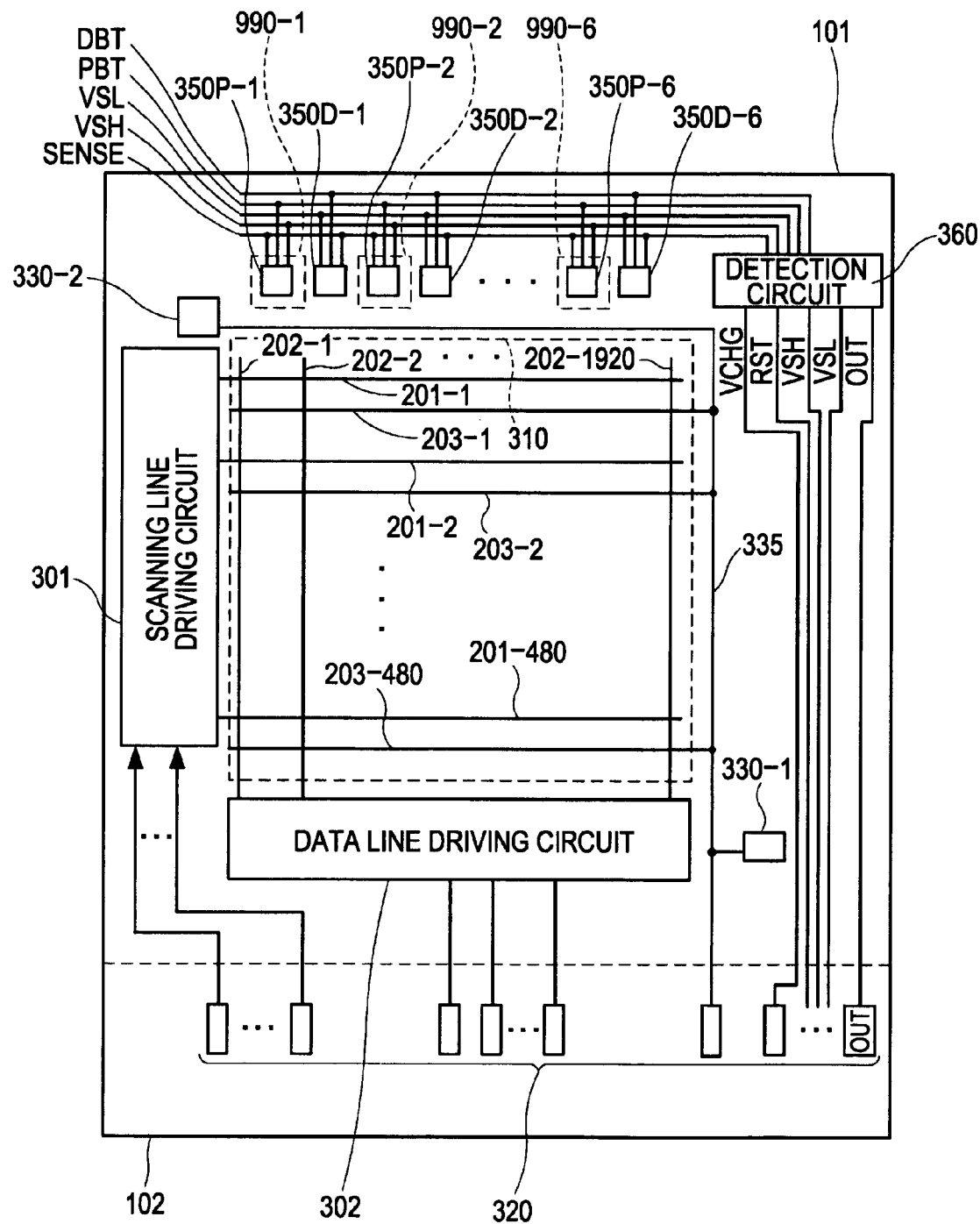
FIG. 2 is a block diagram of an active matrix substrate according to a first embodiment of the invention.

FIG. 2 is a block diagram of the active matrix substrate 101. On the active matrix substrate 101, 480 scanning lines 201-1 to 201-480 and 1920 data lines 202-1 to 202-1920 are formed perpendicularly to one another, and 480 capacitor lines 203-1 to 203-480 are arranged parallel to the scanning lines 201-1 to 201-480. The capacitor lines 203-1 to 203-480 are short-circuited to one another and are connected to a common potential wiring 335, and further connected to the two opposite conducting portions 330-1 and 330-2. Thus, the capacitor lines 203-1 to 203-480 are applied with a common electric potential that has an inversion signal of 0 V to 5 V and an inversion interval of 35 μs from the signal input terminal 320. The scanning lines 201-1 to 201-480 are connected to a scanning line driving circuit 301, and the data lines 202-1 to 202-1920 are connected to a data line driving circuit 302. Thus, the scanning lines 201-1 to 201-480 and the data lines 202-1 to 202-1920 are appropriately driven, respectively.

In addition, the scanning line driving circuit 301 and the data line driving circuit 302 are supplied from the signal input terminal 320 with signals necessary for driving. The signal input terminal 320 is arranged on the extended portion 102. On the other hand, the scanning line driving circuit 301 and the data line driving circuit 302 are arranged in a region that overlaps the opposite substrate 912, that is, arranged outside the extended portion 102. The scanning line driving circuit 301 and the data line driving circuit 302 are formed so that polysilicon thin-film transistors are integrated on the active matrix substrate by means of a system on glass (SOG) technology, by which circuit functions necessary for driving are integrated on the active matrix substrate through a low-temperature polysilicon TFT process. The scanning line driving circuit 301 and the data line driving circuit 302 are manufactured in the same process as pixel switching elements 401-*n*-*m*, which will be described later. That is, the liquid crystal display device is of a built-in driving circuit type.

In addition, six light receiving sensors 350P-1 to 350P-6 are formed in regions that respectively overlap the six light receiving opening portions 990-1 to 990-6 in plan view, and six light shielding sensors 350D-1 to 350D-6 are formed alternately between the adjacent light receiving sensors 350P-1 to 350P-6. These light receiving sensors 350P-1 to 350P-6 and light shielding sensors 350D-1 to 350D-6 are also formed on the active matrix substrate by means of a system on glass (SOG) technology. By manufacturing these light receiving sensors 350P-1 to 350P-6 and light shielding sensors 350D-1 to 350D-6 in the same process as the pixel switching elements 401-*n*-*m* on the glass substrate, it is possible to reduce manufacturing costs.

The light receiving sensors 350P-1 to 350P-6 overlap the light receiving opening portions 990-1 to 990-6 in plan view and, thereby, ambient light reaches the sensors, whereas the light shielding sensors 350D-1 to 350D-6 do not overlap the light receiving opening portions 990-1 to 990-6 in plan view and, therefore, ambient light is absorbed by the black matrix 940, formed on the opposite electrode 930, and hardly reach the sensors. The light receiving sensors 350P-1 to 350P-6 are connected to a wiring PBT, a wiring VSH and a wiring SENSE. The light shielding sensors 350D-1 to 350D-6 are connected to a wiring DBT, a wiring VSL and the wiring SENSE. These wiring PBT, wiring VSH, wiring SENSE, wiring DBT and wiring VSL are connected to a detection circuit 360. The detection circuit 360 converts an analog electric current, which is output from the light receiving sensors 350P-1 to 350P-6 and the light shielding sensors 350D-1 to 350D-6 and which correlates with an illuminance of ambient light, into a binary output signal OUT having a pulse length corresponding to the output analog electric current, and outputs the binary output signal OUT to the signal input terminal 320. In addition, a wiring VCHG, a wiring RST, the wiring VSL and the wiring VSH are also used to supply signals through the signal input terminal 320 to the detection circuit 360.

As will be described in detail later, the light receiving sensors 350P-1 to 350P-6 overlap backlight light shielding electrodes 611P-1 to 611P-6 in plan view, the light shielding sensors 350D-1 to 350D-6 overlap backlight light shielding electrodes 611D-1 to 611D-6 in plan view, and each of the sensors is shielded against light emitted from the backlight. In this manner, it is configured so that the accuracy of detection of ambient light is not reduced by light emitted from the backlight. In addition, the light receiving sensors 350P-1 to 350P-6 also overlap transparent electrodes 612P-1 to 612P-6, and the light shielding sensors 350D-1 to 350D-6 also overlap transparent electrodes 612D-1 to 612D-6. Thus, there is no possibility that the detection accuracy is reduced by electromagnetic noise that will be generated when a display area 310 (the dotted line indicates boundary sides of the display area 310) is driven. With the above configuration, because the detection accuracy is not reduced even when the light receiving sensors 350P-1 to 350P-6 and the light shielding sensors 350D-1 to 350D-6 are arranged in proximity to the display area 310, the flexibility of design may be improved as compared with the existing products. Here, the light receiving opening portions 990-1 to 990-6 are preferably separated into a plurality of groups and arranged so as to be distributed over a range as wide as possible, as in the case of the present embodiment. For example, taking into consideration a reduced influence on detection of ambient light even when a finger, or the like, partly shades the liquid crystal display device 910, the total area of the light receiving opening portions is preferably as large as possible. However, if the light receiving sensors having a large area are collectively arranged at a specific portion, it is necessary to increase a distance between the light receiving sensors and the light shielding sensor and, therefore, there occurs a temperature distribution within the liquid crystal display device 910. As a result, a difference in average temperature occurs between the light receiving sensor portion and the light shielding sensor portion. In the present embodiment, the sensors are separated into a plurality of groups and, in addition, are desirably arranged alternately, it is possible to make the average temperatures of the light receiving sensor portion and the light shielding sensor portion be substantially equal. In the present embodiment, the sensors are separated into six groups; however, the number of groups may be smaller or larger than six. In addition, in this case, the light receiving opening portions 990-1 to 990-6 are preferably arranged so that a distance between the display area 310 and the end portion of each of the light receiving opening portions 990-1 to 990-6 is equal. Similarly, the light receiving sensors 350P-1 to 350P-6 and the light shielding sensors 350D-1 to 350D-6 are arranged so that a distance between the display area 310 and each of the light receiving sensors 350P-1 to 350P-6 and the light shielding sensors 350D-1 to 350D-6 is equal. Light transmitted from the display area 310 toward the outside for display is reflected multiple times by, for example, a glass that forms the active matrix substrate 101 or the opposite substrate 912, a surface of the upper polarizer 924, an interface of various insulating films, or the like, and part of stray light enters the optical sensors. At this time, the intensity of stray light that enters each of the light receiving sensors 350P-1 to 350P-6 and the intensity of stray light that enters each of the light shielding sensors 350D-1 to 350D-6, when arranged as described above, are substantially constant. Thus, as in the case of the present embodiment, when a differential in flowing electric current between each of the light receiving sensors 350P-1 to 350P-6 and each of the light shielding sensors 350D-1 to 350D-6 is used, it is possible to substantially remove the electric current based on stray light. From this point of view, when the light receiving opening portions 990-1 to 990-6 are separated into a plurality of groups and arranged so as to be distributed over a range as wide as possible, it is preferable because the light receiving opening portions 990-1 to 990-6 are hardly influenced by the display pattern of the display area 310. In addition, each of the light receiving sensors 350P-1 to 350P-6 and each of the light shielding sensors 350D-1 to 350D-6 are preferably arranged at a side that is as far as possible from the backlight unit 926, as in the case of the present embodiment. This is because the backlight unit 926, whatever it is an LED or a CCFL, becomes a heat source and, therefore, heat gradient in the active matrix substrate 101 increases as it is closer to the backlight unit 926, so that it is easy to generate a difference in temperature among the light receiving sensors 350P-1 to 350P-6 and the light shielding sensors 350D-1 to 350D-6. Moreover, when the size of the light receiving opening portions 990-1 to 990-6 is increased along a direction (hereinafter, referred to as X direction) parallel to the boundary side of the peripheral portion of the display area 310, at which the light receiving opening portions 990-1 to 990-6 are arranged, it influences on the basis of temperature distribution and/or stray light. Furthermore, when the size of the light receiving opening portions 990-1 to 990-6 is increased along a direction (hereinafter referred to as Y direction) perpendicular to the boundary side of the display area 310, the size of a window frame region increases and, therefore, the overall size of the liquid crystal display device 910 also increases, and, in addition, light of the display area 310 reflected on an interface between the opposite substrate 912 and the upper polarizer 924 is irradiated as stray light to each of the light receiving sensors 350P-1 to 350P-6 and each of the light shielding sensors 350D-1 to 350D-6. This may cause a measurement error. On the other hand, when the size of the light receiving opening portions 990-1 to 990-6 is reduced too much in the X direction, the efficiency of arrangement gets worse and, as a result, the channel width (W) of a PIN diode is reduced, whereas, when the size of the light receiving opening portions 990-1 to 990-6 is reduced in the Y direction, the efficiency of light uptake gets worse and, as a result, it influences the accuracy of detection. After a study based on the above described conditions, it has reached a conclusion that the size of the light receiving opening portions 990-1 to 990-6 desirably ranges from 0.5 mm to 20 mm in the X direction and ranges from 0.05 mm to the thickness of the opposite substrate 912 (0.6 mm in this embodiment) in the Y direction. In view of the above, in the present embodiment, the size is set to 10 mm in the X direction and 0.3 mm in the Y direction. In addition, the distance from the display area 310 to the end portion of each of the light receiving opening portions 990-1 to 990-6 is set to 0.5 mm. The light receiving opening portions 990-1 to 990-6 are arranged at a pitch of 20 mm. The light receiving sensor 350P-1 and the light shielding sensor 350D-1 are arranged at a pitch of 10 mm. The light shielding sensor 350D-1 and the light receiving sensor 350P-2 is also arranged at a pitch of 10 mm. In this manner, the light receiving sensors 350P-1 to 350P-6 and the light shielding sensors 350D-1 to 350D-6 are alternately arranged at a pitch of 10 mm.

Figure 3:
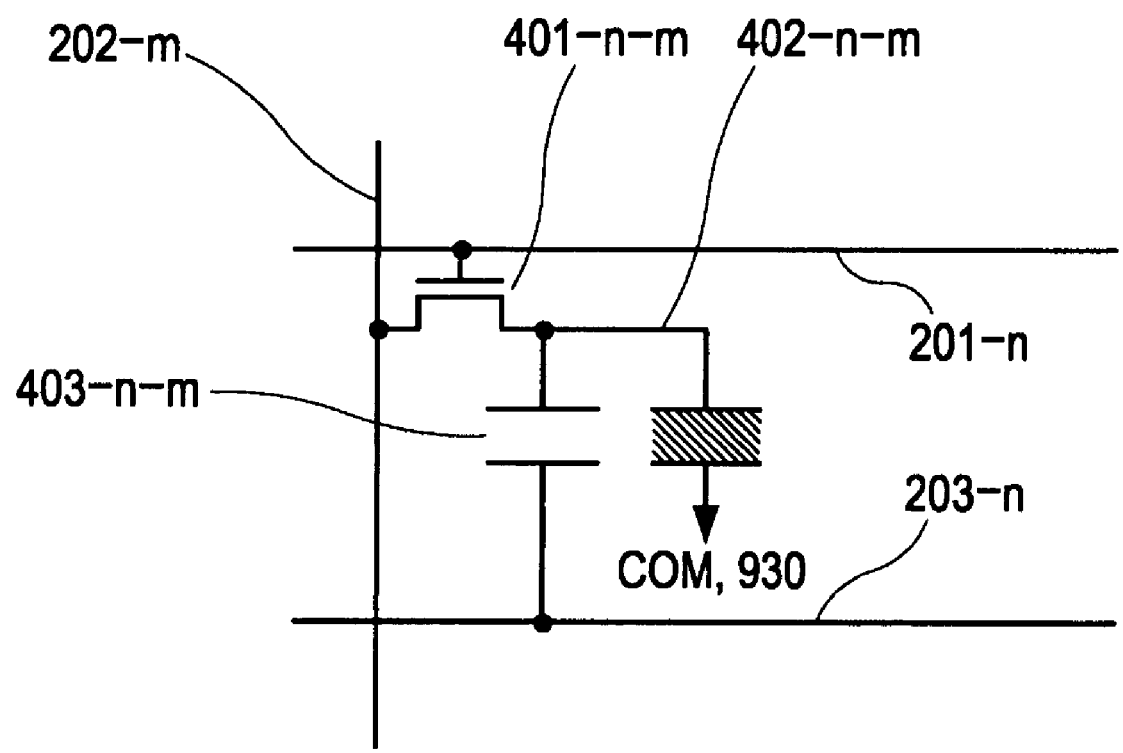
FIG. 3 is a pixel circuit diagram of the active matrix substrate according to the embodiment of the invention.

FIG. 3 is a circuit diagram of a portion around an intersection of the m-th data line 202-*m* and the n-th scanning line 201-*n* in the display area indicated by the dotted line 310 in FIG. 2. The pixel switching element 401-*n*-*m*, which is formed of an n-channel field effect polysilicon thin-film transistor, is formed at the intersection of the scanning line 201-*n* and the data line 202-*m*, the gate electrode of the switching element 401-*n*-*m* is connected to the scanning line 201-*n* and the source and drain electrodes are respectively connected to the data line 202-*m* and a pixel electrode 402-*n*-*m*. The pixel electrode 402-*n*-*m* and an electrode that is short-circuited to the same electric potential of the pixel electrode 402-*n*-*m* form an auxiliary capacitor 403-*n*-*m* with the capacitor line 203-*n* and, when assembled into a liquid crystal display device, also form a capacitor with the opposite electrode 930 (common electrode) with a liquid crystal element interposed therebetween.

Figure 4:
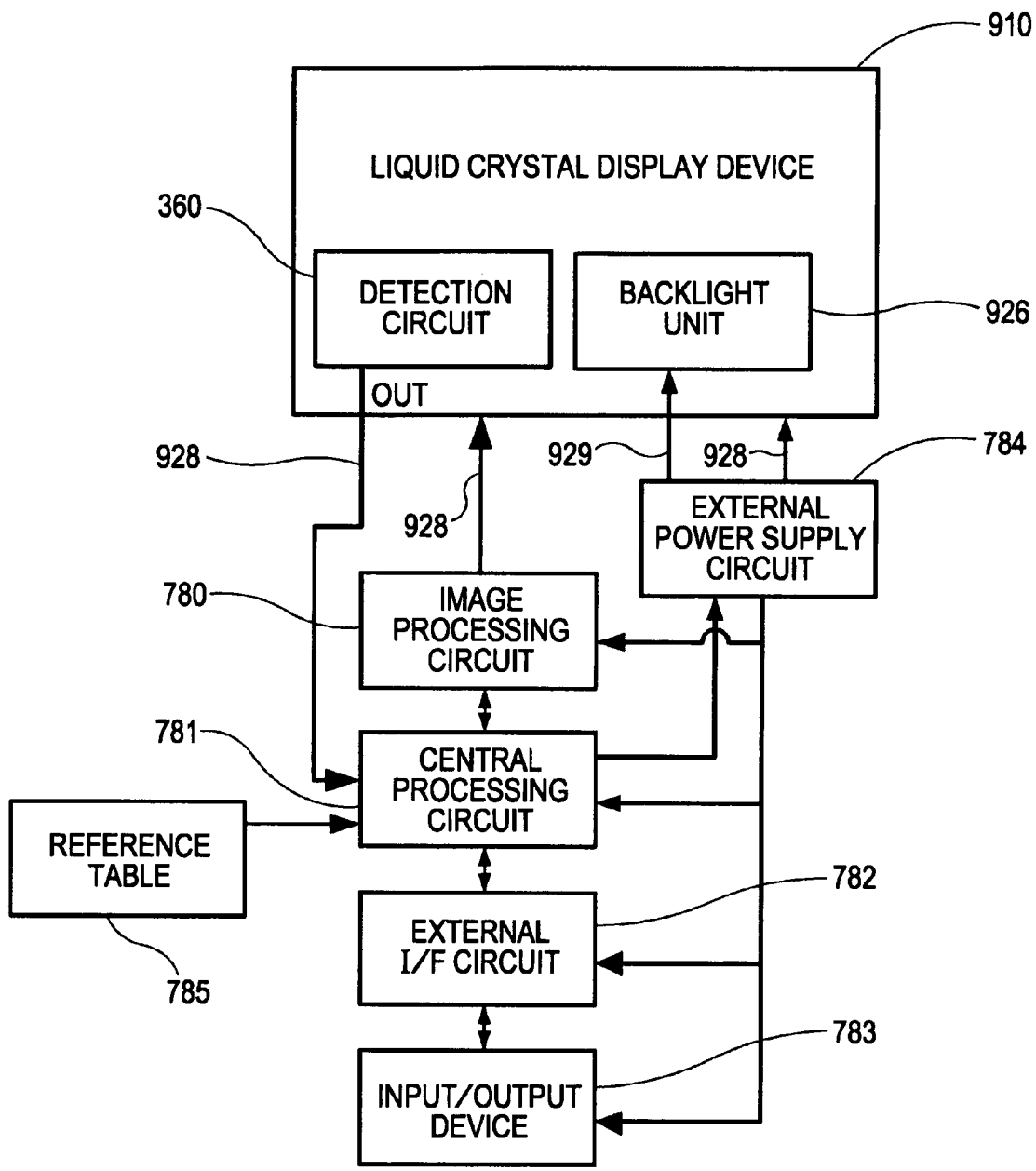
FIG. 4 is a block diagram that shows an embodiment of an electronic apparatus according to the invention.

FIG. 4 is a block diagram that specifically shows a configuration of an electronic apparatus according to the present embodiment. The liquid crystal display device 910 is the liquid crystal display device as described with reference to FIG. 1, and an external power supply circuit 784 and an image processing circuit 780 supply necessary signals and power to the liquid crystal display device 910 through the FPC (flexible printed circuit) board 928 and the connector 929. A central processing circuit 781 acquires data input from an input/output device 783 through an external I/F circuit 782. Here, the input/output device 783 includes, for example, a keyboard, a mouse, a trackball, an LED, a speaker, an antenna, and the like. The central processing circuit 781 executes various operation processes on the basis of data from the outside and transfers the result as a command to the image processing circuit 780 or the external I/F circuit 782.

The image processing circuit 780 updates image information on the basis of a command issued by the central processing circuit 781 and changes a signal that is supplied to the liquid crystal display device 910. Thus, an image displayed by the liquid crystal display device 910 changes. In addition, a binary output signal OUT supplied from the detection circuit 360, which is provided on the liquid crystal display device 910, is input through the FPC (flexible printed circuit) board 928 to the central processing circuit 781, and the central processing circuit 781 then converts the pulse length of the binary output signal OUT into a corresponding discrete value. Subsequently, the central processing circuit 781 accesses to a reference table 785 implemented in an EEPROM (Electronically Erasable and Programmable Read Only Memory), and reconverts the converted discrete value into an appropriate value corresponding to a voltage of the backlight unit 926, and then transmits the value to the external power supply circuit 784. The external power supply circuit 784 supplies electric potential power of a voltage corresponding to the transmitted value to the backlight unit 926 provided in the liquid crystal display device 910 through the connector 929. Because the luminance of the backlight unit 926 varies depending on a voltage supplied from the external power supply circuit 784, the luminance of the liquid crystal display device 910 in complete white display also varies. Here, the electronic apparatus specifically includes a monitor, a television, a notebook computer, a personal digital assistants (PDA), a digital camera, a video camera, a cellular phone, a mobile photo viewer, a mobile video player, a mobile DVD player, a mobile audio player, and the like.

Note that, in the present embodiment, the central processing circuit 781 provided on the electronic apparatus controls the luminance of the backlight unit 926; however, for example, a driver IC and an EEPROM may be provided in the liquid crystal display device 910, and the driver IC then may have the function of converting a binary output signal OUT into a discrete value, the function of reconverting by referring to the EEPROM, and the function of adjusting a voltage output to the backlight unit 926. In addition, it may be configured to reconvert a discrete value into a value corresponding to a voltage of the backlight unit 926 through numerical calculation without using a reference table.

Figure 5:
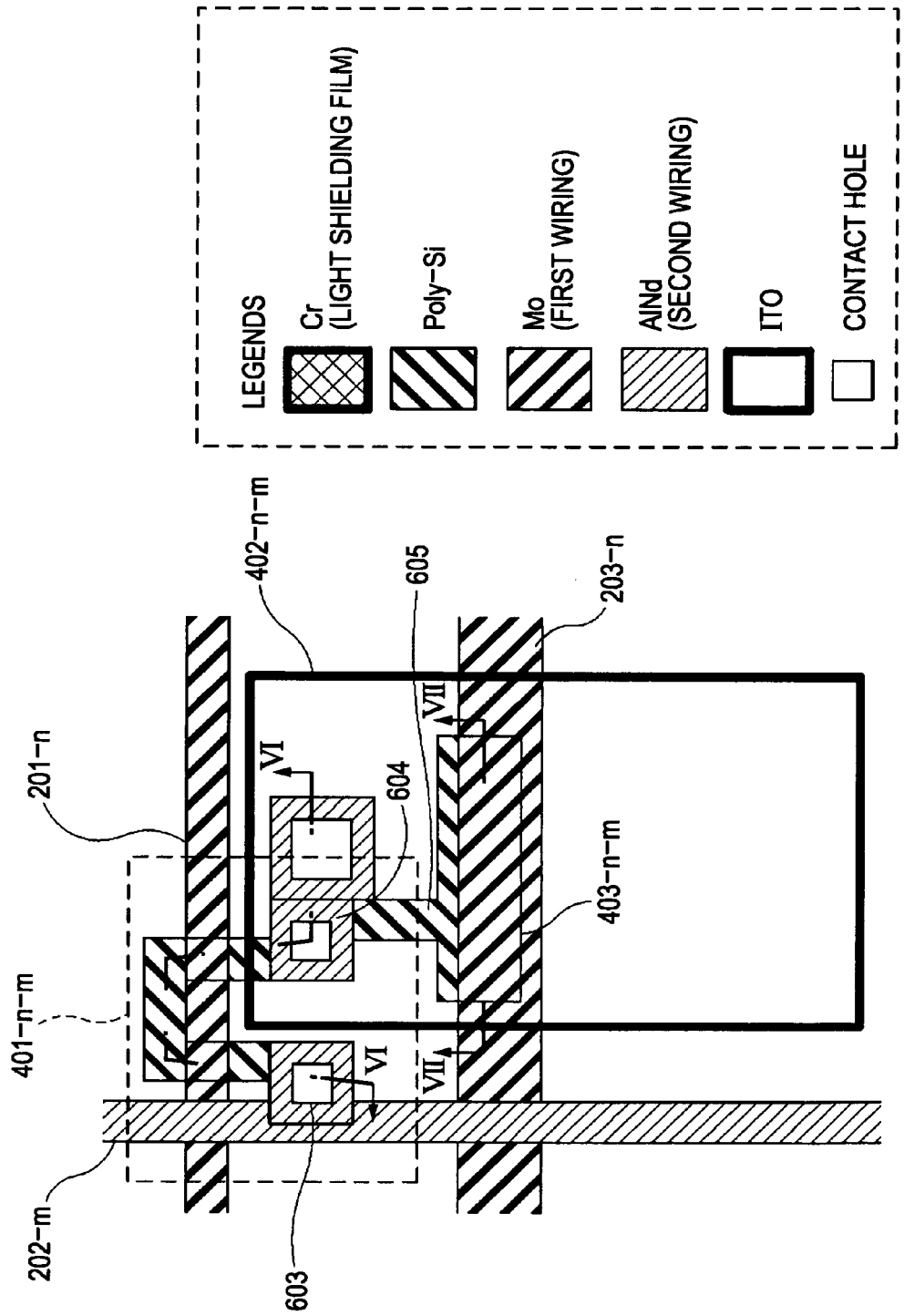
FIG. 5 is a plan view of a pixel portion of the active matrix substrate according to the embodiment of the invention.

FIG. 5 is a plan view of an actual configuration of the circuit diagram of the pixel display area shown in FIG. 3. As is shown in the legends of FIG. 5, portions having different patterns respectively indicate wirings having different materials, and portions having the same pattern indicate wirings having the same material. The pixel display area is formed of five layer thin films consisting of a chromium thin film (Cr), a polysilicon thin film (Poly-Si), a molybdenum thin film (Mo), an aluminum-neodymium alloy thin film (AlNd), indium tin oxide thin film (Indium Tin Oxide=ITO), and an insulating film formed of any one of silicon oxide, silicon nitride, and organic insulating film, or formed of a laminated film that includes any two or more of silicon oxide, silicon nitride, and organic insulating film in combination.

Specifically, the chromium (Cr) thin film has a thickness of 100 nm, the polysilicon (Poly-Si) thin film has a thickness of 50 nm, the molybdenum (Mo) thin film has a thickness of 200 nm, the aluminum-neodymium (AlNd) alloy thin film has a thickness of 500 nm, and the indium tin oxide (ITO) thin film has a thickness of 100 nm. In addition, a base insulating film, which is formed of laminated silicone nitride film having a thickness of 100 nm and silicon oxide film having a thickness of 100 nm, is formed between the chromium (Cr) thin film and the polysilicon (Poly-Si) thin film. A gate insulating film, which is formed of silicon oxide film having a thickness of 100 nm, is formed between the polysilicon (Poly-Si) thin film and the molybdenum (Mo) thin film. An interlayer insulating film, which is formed of laminated silicon nitride film having a thickness of 200 nm and silicon oxide film having a thickness of 500 nm, is formed between the molybdenum (Mo) thin film and the aluminum-neodymium (AlNd) thin film. A protection insulating film, which is formed of laminated silicon nitride film having a thickness of 200 nm and organic planarizing film having an average thickness of 1 μm, is formed between the aluminum-neodymium (AlNd) alloy thin film and the indium tin oxide (ITO) film. Thus, electrical insulation is achieved between the adjacent wirings, and a contact hole is opened at an appropriate position in the insulating films to connect the thin films one another. Note that the chromium (Cr) thin film is not shown in FIG. 5.

As shown in FIG. 5, the data line 202-m is formed of an aluminum-neodymium alloy (AlNd) thin film and connected through a contact hole to the source electrode of the pixel switching element 401-n-m. The scanning line 201-n is formed of a molybdenum (Mo) thin film and also serves as the gate electrode of the pixel switching element 401-n-m. The capacitor line 203-n is formed of the same wiring material as the scanning line 201-n, and the pixel electrode 402-n-m is formed of an indium tin oxide thin film. The capacitor line 203-n and the pixel electrode 402-n-m are connected to the drain electrode of the pixel switching element 401-n-m through a contact hole. In addition, the drain electrode of the pixel switching element 401-n-m is also connected to a capacitor electrode 605, which is formed of an n+-type polysilicon thin film that is densely doped with phosphorus, and overlaps the capacitor line 203-n in plan view to form the auxiliary capacitor 403-n-m.

Figure 6:
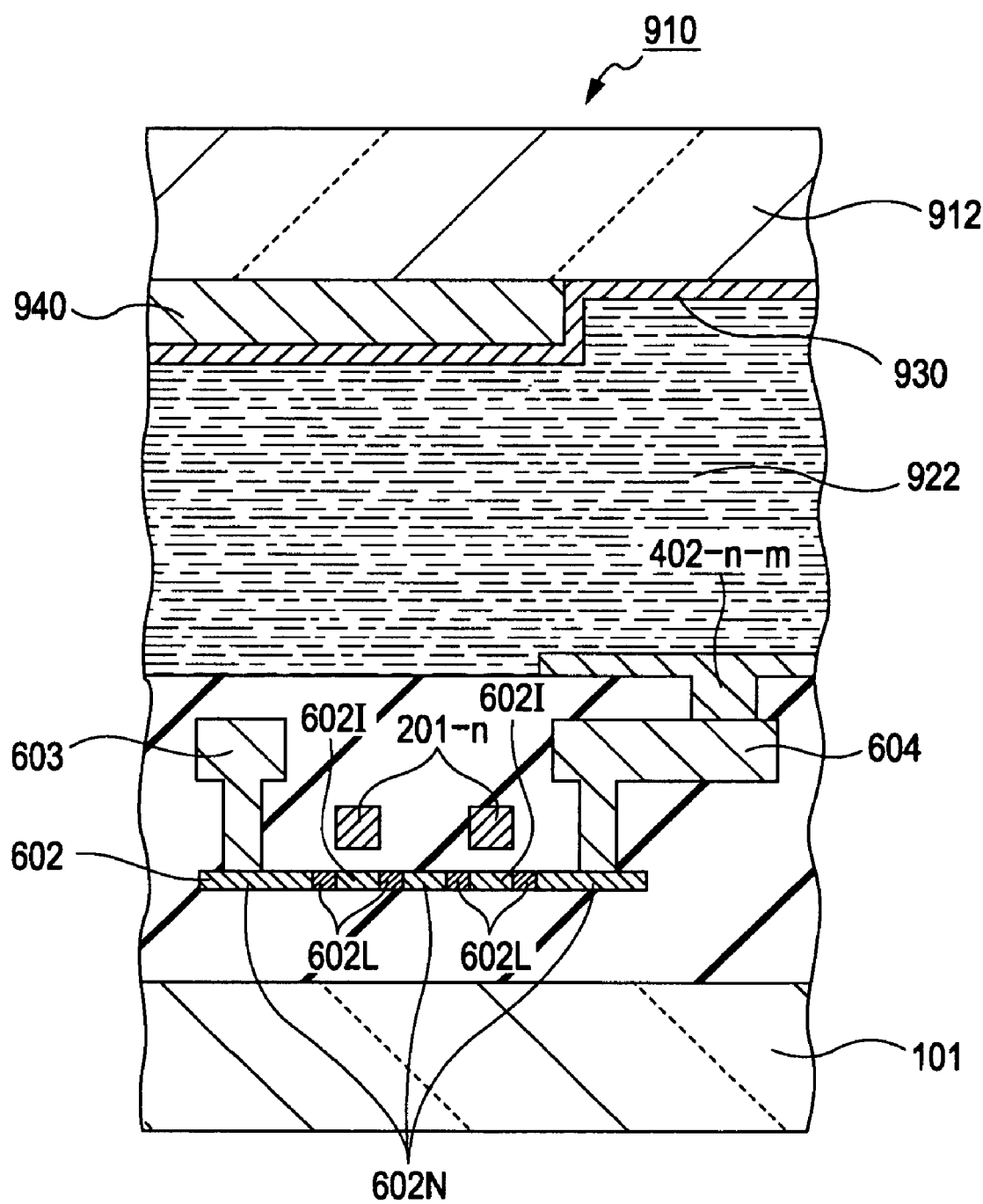
FIG. 6 is a cross-sectional view that is taken along the line VI-VI in FIG. 5.

FIG. 6 is a cross-sectional structure of a portion of the liquid crystal display device 910, taken along the line VI-VI in FIG. 5, for illustrating the structure of the pixel switching element 401-n-m. Note that the scale is not fixed for easy recognition. The active matrix substrate 101 is a 0.6 mm-thick insulating substrate formed of non-alkali glass. A silicon island 602, which is formed of a polysilicon thin film, is formed on the active matrix substrate 101 through a base insulating film that is formed by laminating a 200 nm-thick silicon nitride film and a 300 nm-thick silicon oxide film. The scanning line 201-n is arranged above the silicon island 602 via the above described gate insulating film.

The silicon island 602 has an LDD (Lightly Doped Drain) structure such that regions that overlap the scanning line 201-n are intrinsic semiconductor regions 602I that are not doped at all or extremely lightly doped with phosphorus ions, and n-regions 602L having a sheet resistance of about 20 kΩ are formed on both sides of each of the intrinsic semiconductor regions 602I and are lightly doped with phosphorus ions, and, furthermore, n+ regions 602N having a sheet resistance of about 1 kΩ are formed on both sides of each of the n-regions 602L and are densely doped with phosphorus ions. The left and right n+ regions 602N located on both sides of the silicon island 602 are respectively connected to a source electrode 603 and a drain electrode 604 through contact holes formed in the interlayer insulating film. The source electrode 603 is connected to the data line 202-*m*. The drain electrode 604 is connected to the pixel electrode 402-*n*-*m* formed on the planarizing insulating film. A nematic phase liquid crystal material 922 is present between the pixel electrode 402-*n*-*m* and the opposite electrode 930 that is formed on the opposite substrate 912. In addition, the black matrix 940 is formed on the opposite substrate 912 so as to partly overlap the pixel electrode 402-*n*-*m*. Note that, when there is a problem with light leakage current of the pixel switching element 401-*n*-*m*, a light shielding layer, which is formed of a Cr film, may be formed below the silicon island 602. In the present embodiment, there is substantially no problem with light leakage current and, further, with the above configuration, the mobility of the pixel switching element 401-*n*-*m* decreases. Thus, the configuration in which a chromium film is not formed below the silicon island 602 is selected.

Figure 7:
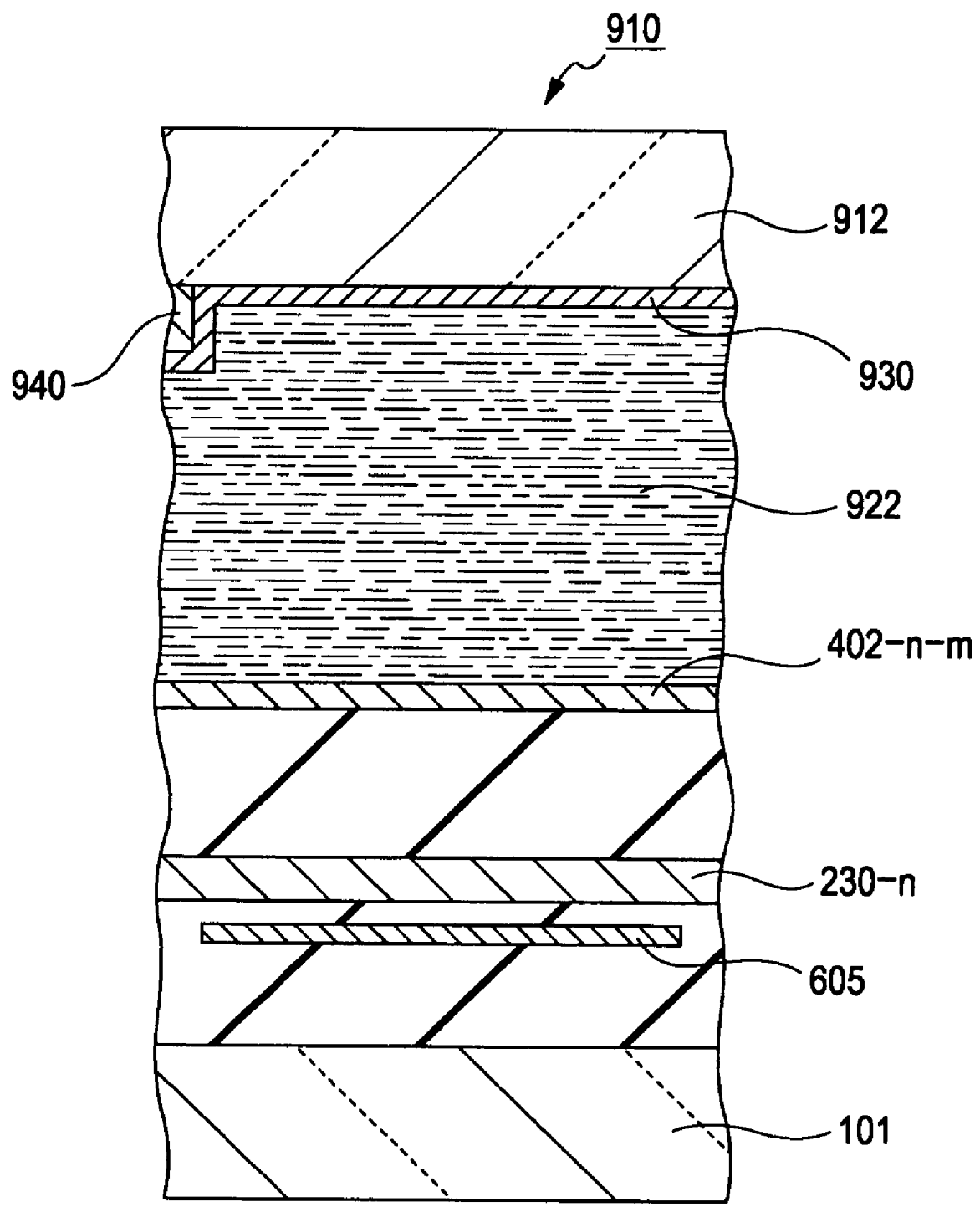
FIG. 7 is a cross-sectional view that is taken along the line VII-VII in FIG. 5.

FIG. 7 is a cross-sectional structure of a portion of the liquid crystal display device 910, taken along the line VII-VII in FIG. 5, for illustrating the structure of the auxiliary capacitor 403-*n*-*m*. A storage capacitor is formed so that the capacitor electrode 605, which is connected to the drain electrode 604, and capacitor line 203-*n* overlap each other with the gate insulating film interposed therebetween.

Figure 8:
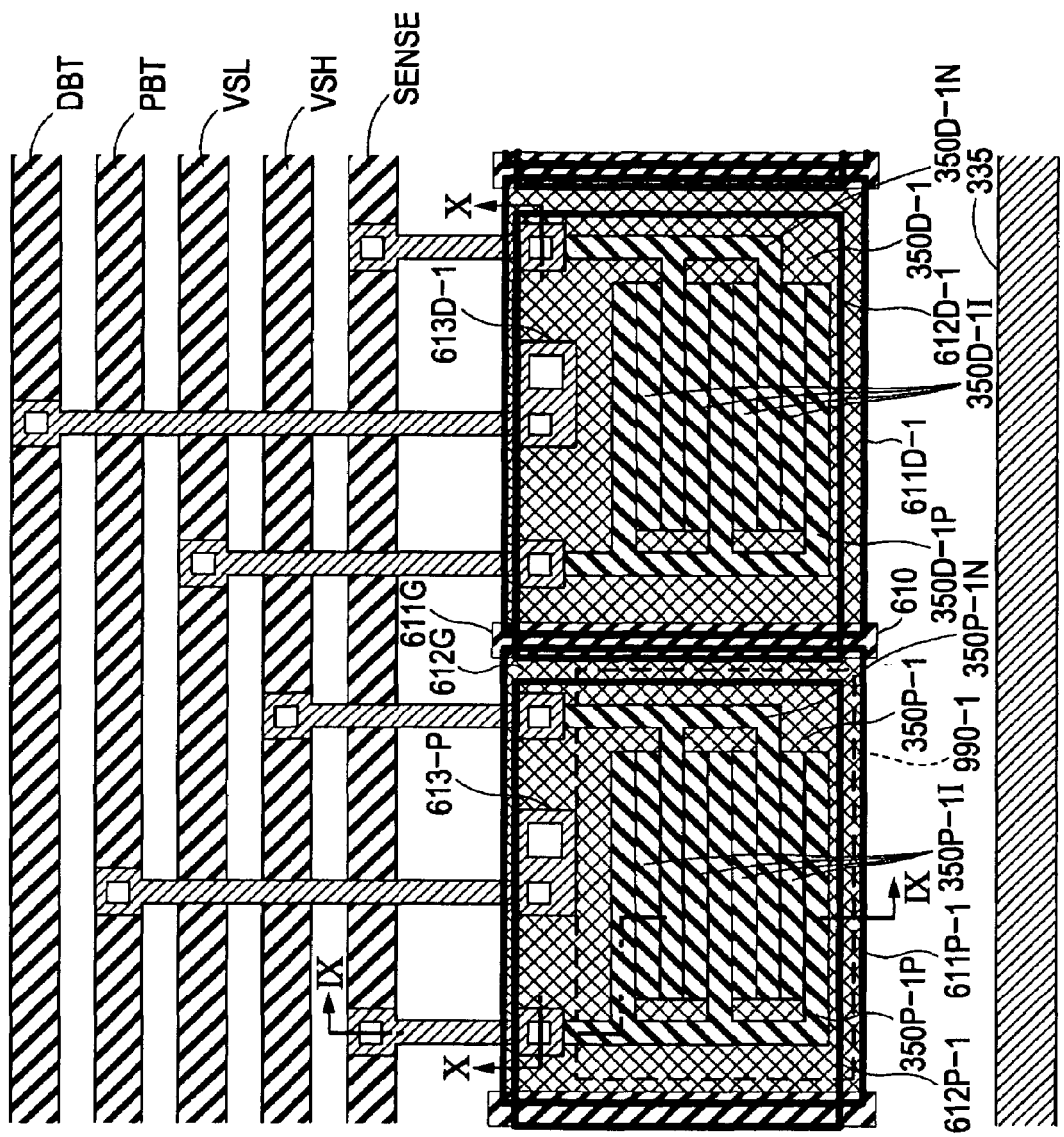
FIG. 8 is a plan view of a light receiving sensor and a light shielding sensor according to the first embodiment of the invention.

FIG. 8 is an enlarged plan view of a portion around the light receiving sensor 350P-1 (first optical sensor) and the light shielding sensor 350D-1 (second optical sensor). Note that the vertical and horizontal scales are not fixed for easy recognition. In addition, the legends indicate the same as those in FIG. 5. The light receiving sensor 350P-1 overlaps the light receiving opening portion 990-1, indicated by thick dotted line, in plan view and ambient light may be irradiated to the light receiving sensor 350P-1. The light receiving sensor 350P-1 includes four separated light receiving portions 350P-1I, an anode region 350P-1P that is arranged adjacent to the light receiving portions 350P-1I and connected to the wiring SENSE, and a cathode region 350P-1N that is arranged adjacent to the light receiving portions 350P-1I and connected to the wiring VSH. The light receiving portions 350P-1I, the anode region 350P-1P and the cathode region 350P-1N are formed in such a manner that the same polysilicon thin film island is separated using a difference in doping concentration. The anode region 350P-1P is relatively densely doped with boron ions. The cathode region 350P-1N is relatively densely doped with phosphorus ions. The light receiving portions 350P-1I each contain extremely lightly doped boron ions and phosphorus ions.

In addition, the anode region 350P-1P, the cathode region 350P-1N and the light receiving portions 350P-1I each have a width of 10 μm, and the light receiving portions 350P-1I each have a length of 1000 μm. In this manner, the light receiving sensor 350P-1 forms a plurality of PIN junction diodes that are connected in parallel with one another. The common potential wiring 335 is arranged on a side adjacent to the display area 310 relative to the light receiving sensor 350P-1 and the light shielding sensor 350D-1; however, in the present embodiment, the common potential wiring 335 is not connected to the light receiving sensor 350P-1 or the light shielding sensor 350D-1, and is arranged so as to be spaced apart at an interval of 100 μm in order to avoid an influence of electromagnetic noise.

The light shielding sensor 350D-1 includes four separated light receiving portions 350D-1I, an anode region 350D-1P that is arranged adjacent to the light receiving portions 350D-1I and connected to the wiring VSL, and a cathode region 350D-1N that is arranged adjacent to the light receiving portions 350D-1I and connected to the wiring SENSE. Except that the wirings connected to the cathode and the anode are different and the light shielding sensor 350D-1 does not overlap the light receiving opening portion 990-1 in plan view, the light receiving sensor 350P-1 and the light shielding sensor 350D-1 have the same configuration. Therefore, a further description is omitted. In addition, because the light receiving sensors 350P-2 to 350P-5 have the same configuration as the light receiving sensor 350P-1, and the light shielding sensors 350D-2 to 350D-5 have the same configuration as the light shielding sensor 350D-1, except their arrangement positions, a description thereof is omitted.

Figure 9:
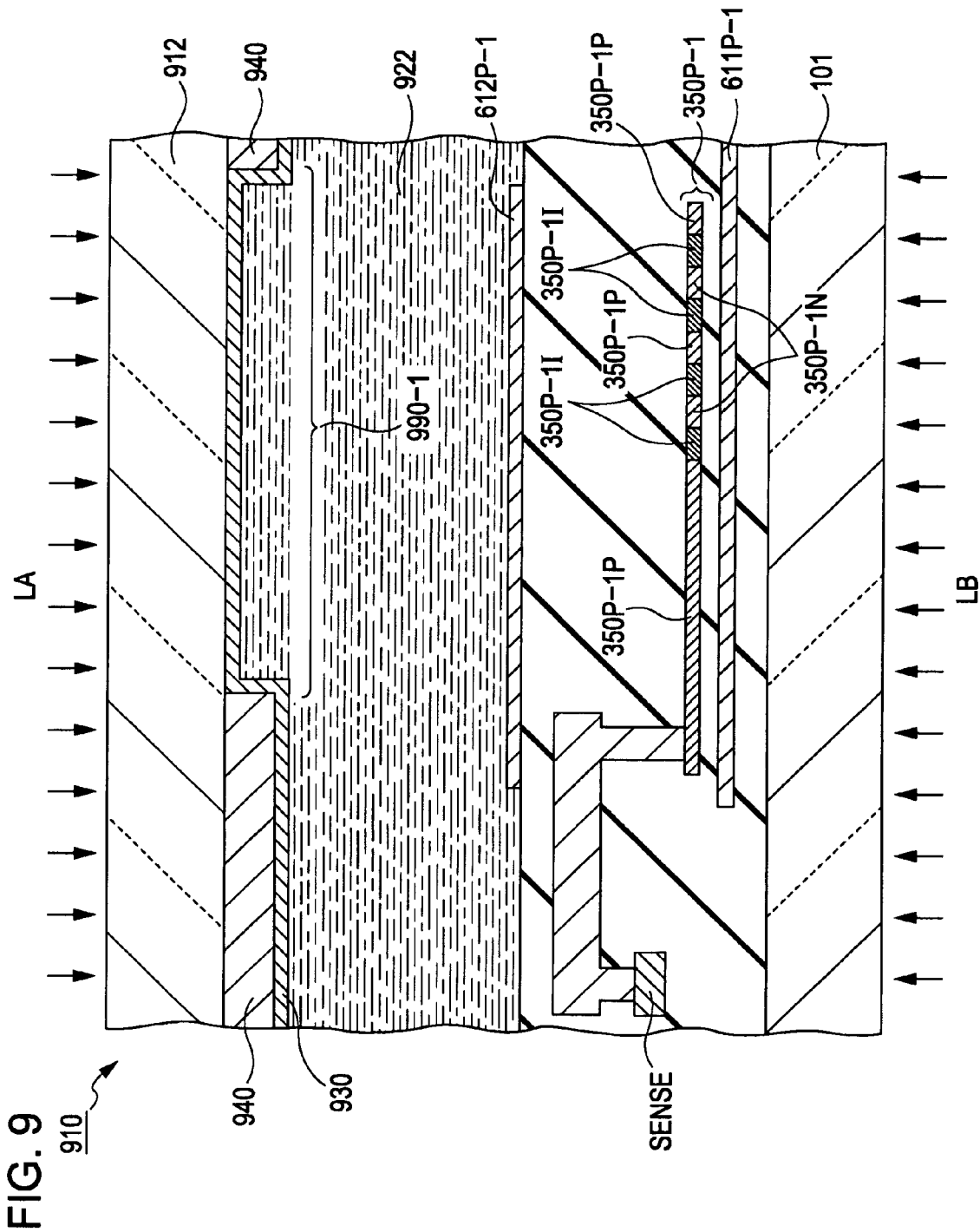
FIG. 9 is a cross-sectional view that is taken along the line IX-IX in FIG. 8.

FIG. 9 is a cross-sectional configuration of a portion of the liquid crystal display device 910, taken along the line IX-IX in FIG. 8, for illustrating the structure of the light receiving sensor 350P-1. A backlight light shielding electrode 611P-1 (first light shielding electrode) is arranged on the active matrix substrate 101 through the base insulating film. The light receiving sensor 350P-1, which is formed of thin-film polysilicon, is formed on the backlight light shielding electrode 611P-1 with the gate insulating film interposed therebetween. As described above, the light receiving sensor 350P-1 includes the four light receiving portions 350P-1I, the anode region 350P-1P that is arranged adjacent to the light receiving portions 350P-1I and connected to the wiring SENSE, and the cathode region 350P-1N that is arranged adjacent to the light receiving portions 350P-1I and connected to the wiring VSH. A transparent electrode 612P-1 (first transparent electrode), which is formed of indium tin oxide (ITO), is formed above the light receiving sensor 350P-1 through the interlayer insulating film and the planarizing insulating film. The transparent electrode 612P-1 functions as an electric field shield for the light receiving portion 350P-1I.

The nematic phase liquid crystal material 922 is encapsulated on the transparent electrode 612P-1, and the opposite electrode 930, which is provided on the opposite substrate 912, is arranged further above the nematic phase liquid crystal material 922. Note that the seal material 923 may be arranged, instead of the nematic phase liquid crystal material 922, depending on a position at which the light receiving sensor 350P-1 is arranged. The light receiving opening portion 990-1 is formed by partly removing the black matrix 940 provided on the opposite substrate 912. Although not shown in the drawing, no light receiving opening portion is present above the light shielding sensor 350D-1, so that the black matrix 940 is not removed.

Ambient light LA is irradiated from the upper side of the opposite substrate 912, whereas light emitted from the backlight unit 926 (backlight LB) is irradiated from the lower side of the active matrix substrate 101. Note that, although not provided in the present embodiment, an optical compensation layer may be provided at the light receiving opening portion 990-1. For example, the spectral characteristics of the light receiving sensor 350P-1 may be made further accordant with the luminosity spectral characteristics in such a manner that one or plurality of color materials that form a color filter corresponding to a pixel formed on the opposite substrate 912 are formed to overlap the light receiving opening portion 990-1. For example, when a color material corresponding to a green pixel is formed to overlap the light receiving opening portion 990-1, a short-wavelength region and a long-wavelength region are cut, so that it is possible to correct the spectral characteristics of the light receiving sensor 350P-1 even when the spectral characteristics are deviated to the short-wavelength region or to the long-wavelength region as compared with the luminosity spectral characteristics. Other than the above, depending on purposes, an antireflection coating, an interference layer, a polarizing layer, or the like, may be formed to overlap the light receiving opening portion 990-1. In addition, although not shown in the drawing, the upper polarizer 924 may overlap the light receiving opening portion 990-1 or may be removed. When the upper polarizer 924 is overlapped, the light receiving opening portion 990-1 becomes more unrecognizable, whereas, when it is removed, luminous sensitivity improves.

In the present embodiment, because the liquid crystal display device 910 is driven with common electrode inversion driving (common AC driving) in which inversion signals are applied to the common potential wiring 335, for low power consumption, the opposite electrode 930 is applied with an AC signal having an amplitude of 0 V to 5 V and a frequency of 14 KHz. However, because electromagnetic wave generated by the opposite electrode 930 is shielded by the transparent electrode 612P-1, substantially no noise is applied to the light receiving sensor 350P-1 when inversion is performed in the opposite electrode 930. Similarly, against electromagnetic noise from the lower side, the backlight light shielding electrode 611P-1 functions as a shield.

Figure 10:
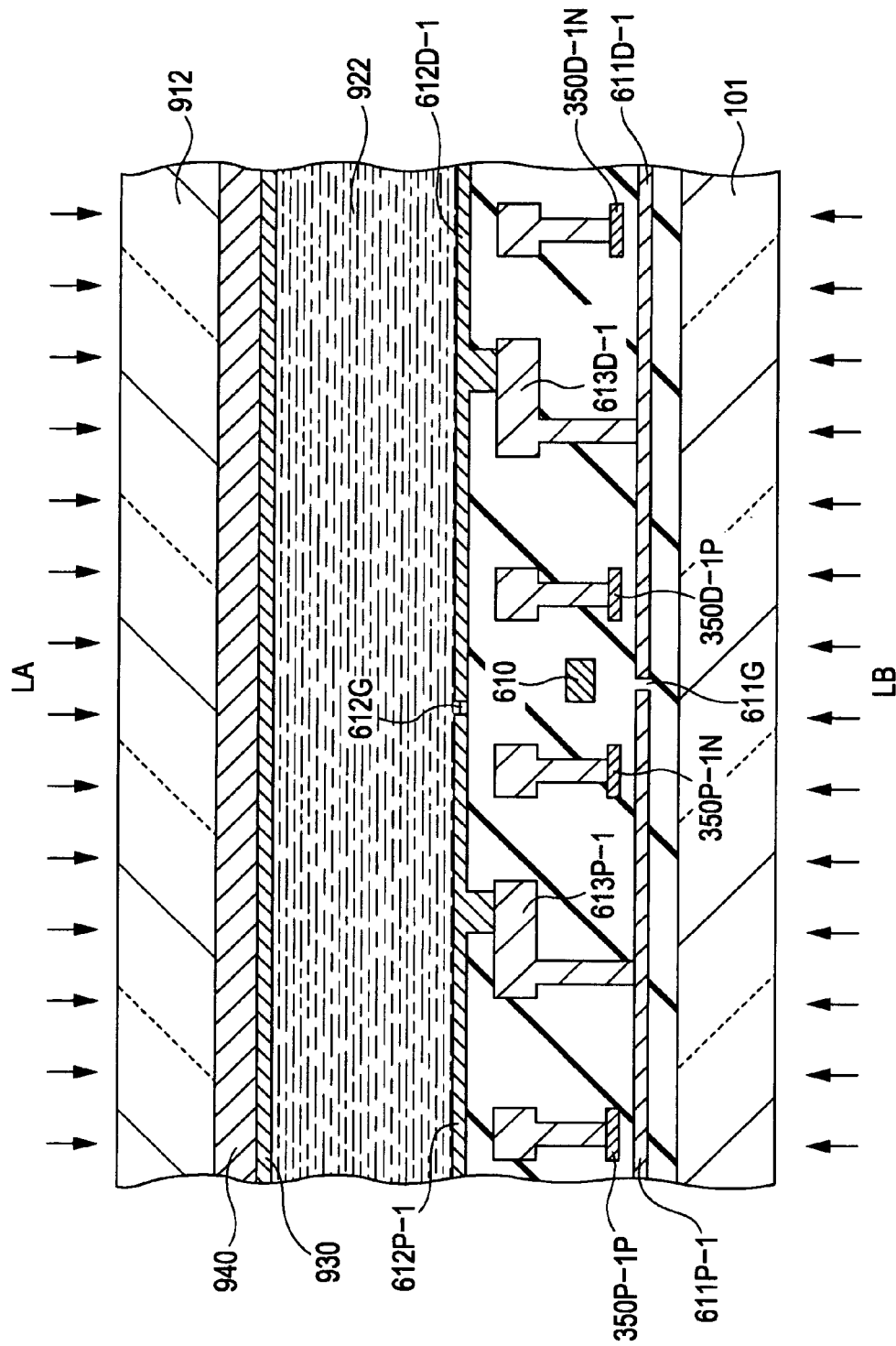
FIG. 10 is a cross-sectional view that is taken along the line X-X in FIG. 8.

FIG. 10 is a cross-sectional structure of a portion of the liquid crystal display device 910, taken along the line X-X in FIG. 8. The backlight light shielding electrode 611P-1 (first light shielding electrode) and the backlight light shielding electrode 611D-1 (second light shielding electrode), both of which are formed on the base insulating film, are spaced apart from each other with a light shielding electrode gap 611G and are applied with separate electric potentials. In addition, the transparent electrode 612P-1 (first transparent electrode) and the transparent electrode 612D-1 (second transparent electrode), both of which are formed on the planarizing insulating film, are also spaced apart from each other with a transparent electrode gap 612G and applied with separate electric potentials. The backlight light shielding electrode 611P-1 and the transparent electrode 612P-1 both are connected to an intermediate electrode 613P-1 through a contact hole, which is formed in the gate insulating film, the interlayer insulating film and the planarizing insulating film, and finally connected to the wiring PBT. The backlight light shielding electrode 611D-1 and the transparent electrode 612D-1 both are connected to an intermediate electrode 613D-1 through a contact hole, which is formed in the gate insulating film, the interlayer insulating film and the planarizing insulating film, and finally connected to the wiring DBT.

Here, the light shielding electrode gap 611G and the transparent electrode gap 612G do not overlap each other in a vertical direction relative to the active matrix substrate 101 and the opposite substrate 912. As the thus configured, because there is no region that is not shielded from the upper and lower sides in plan view, electromagnetic noise that advances through the gaps hardly expands to the left side and to the right side. Thus, it is possible to reduce a decrease in shielding performance due to the gaps.

In addition, a gap light shielding body 610, which is formed of a molybdenum (Mo) thin film, is formed to overlap the light shielding electrode gap 611G. Thus, backlight that advances through the light shielding electrode gap 611G is multiply reflected on interfaces of various insulating films and glasses, or the like to thereby become stray light. Thus, the percentage of backlight that reaches the light receiving sensor 350P-1 or the light shielding sensor 350D-1 is greatly reduced.

Figure 11:
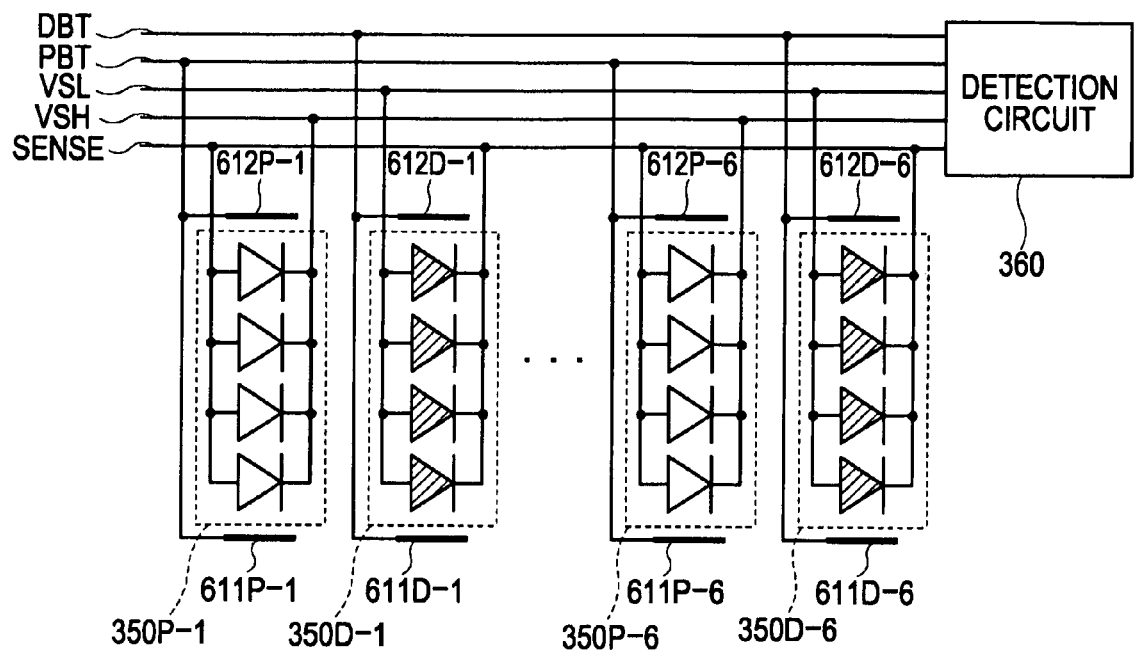
FIG. 11 is an equivalent circuit diagram of the light receiving sensors and the light shielding sensors according to the first embodiment of the invention.
Figure 12:
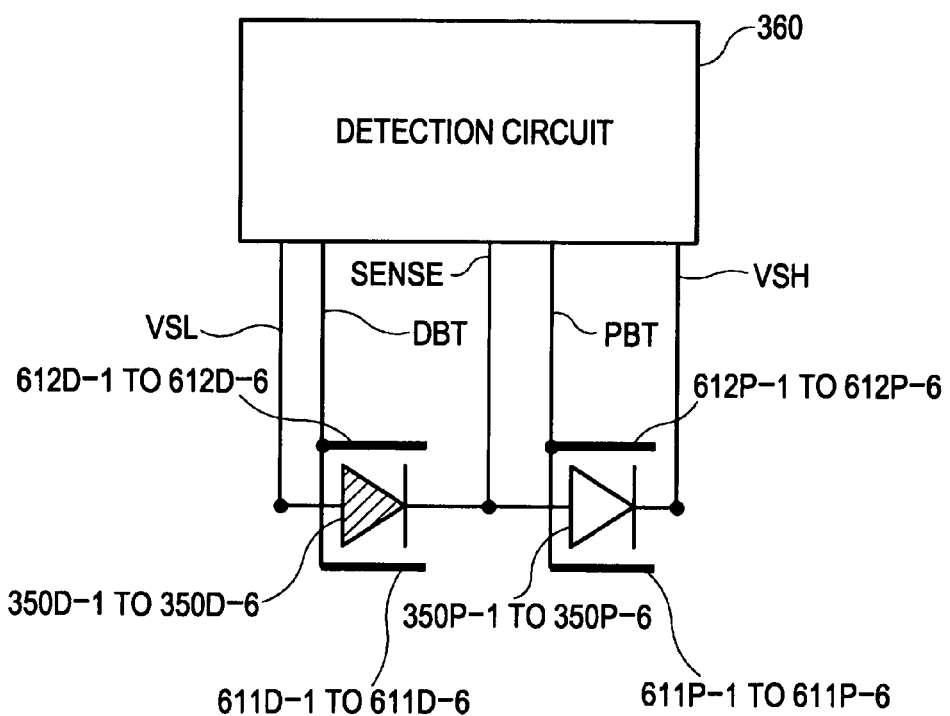
FIG. 12 is a simplified equivalent circuit diagram of the light receiving sensors and the light shielding sensors according to the first embodiment of the invention.

FIG. 11 is an equivalent circuit diagram of the above configured light receiving sensors 350P-1 to 350P-6 and the light shielding sensors 350D-1 to 350D-6. Each of the light receiving sensors 350P-1 to 350P-6, light shielding sensors 350D-1 to 350D-6 includes four PIN diodes that are connected in parallel with one another. In addition, the light receiving sensors 350P-1 to 350P-6 are also connected in parallel with one another, and the light shielding sensors 350D-1 to 350D-6 are also connected in parallel with one another. Therefore, FIG. 11 is finally equivalent to the circuit diagram shown in FIG. 12.

That is, the light shielding sensors 350D-1 to 350D-6 are collectively a PIN diode having a channel width of 24000 μm and a channel length of 10 μm, and the anode of there of is connected to the wiring VSL and the cathode thereof is connected to the wiring SENSE. In addition, the backlight light shielding electrodes 611D-1 to 611D-6 and the transparent electrodes 612D-1 to 612D-6, which overlap the light shielding sensors 350D-1 to 350D-6 in plan view, are connected to the wiring DBT. The light receiving sensors 350P-1 to 350P-6 are collectively a PIN diode having a channel width of 24000 μm and a channel length of 10 μm, and the anode thereof is connected to the wiring SENSE and the cathode is connected to the wiring VSH. In addition, the backlight light shielding electrodes 611P-1 to 611P-6 and the transparent electrodes 612P-1 to 612P-6, which overlap the light receiving sensors 350P-1 to 350P-6 in plan view, are connected to the wiring PBT.

Figure 13:
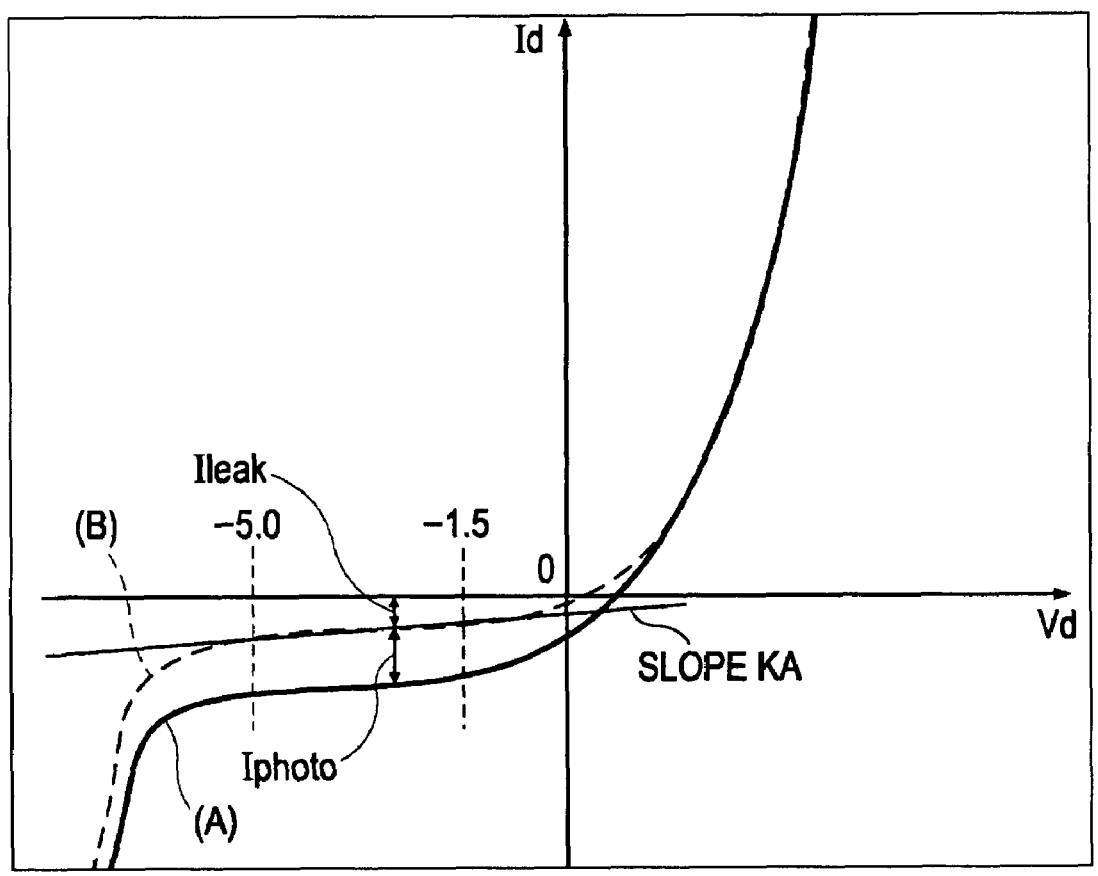
FIG. 13 is a graph that indicates characteristics of a PIN diode that includes the light receiving sensors and a PIN diode that includes the light shielding sensors according to the first embodiment of the invention.

FIG. 13 is a graph that indicates characteristics of the PIN diode that includes the light receiving sensors 350P-1 to 350P-6 and the PIN diode that includes the light shielding sensors 350D-1 to 350D-6, when a constant ambient light illuminance LX is irradiated to the liquid crystal display device 910. The abscissa axis represents a bias electric potential Vd (=(anode electric potential)−(cathode electric potential)), and the ordinate axis represents an amount of electric current that flows between the anode and the cathode. The graph (A) indicated by the solid line is the characteristics of the light receiving sensors 350P-1 to 350P-6, and the graph (B) indicated by the broken line is the characteristics of the light shielding sensors 350D-1 to 350D-6. Thus, both of the characteristics coincide with each other in a forward bias region (Id>0), whereas the absolute value of electric current that flows in the light receiving sensors 350P-1 to 350P-6 indicated by the graph (B) is larger in a reverse bias region (Id<0). This is because the amount of thermoelectric current Ileak caused by a temperature only flows because no ambient light is irradiated to the light shielding sensors 350D-1 to 350D-6, whereas pairs of carriers are generated and the amount of photoelectric current Iphoto then flows when light is irradiated to the light receiving portions 350P-1I to 350P-6I of the PIN diodes that form the light receiving sensors 350P-1 to 350P-6, so that, in the light receiving sensors 350P-1 to 350P-6, the sum of the amount of photoelectric current and the amount of thermoelectric current, that is, Iphoto+Ileak, flows. Here, the amount of thermoelectric current Ileak is an electric current that flows in the reverse bias region (Id<0) on the left side of FIG. 13 when an applied voltage is up to about minus several volts, and is due to that a semiconductor produces electrons and positive holes bit by bit on the basis of temperature and, thereby, electric current is caused to flow.

The amount of thermoelectric current Ileak depends on Vd (=(anode electric potential)−(cathode electric potential)), and may be approximated to a line having a slope KA (KA>0) within the range of $-5.0 \leq Vd \leq -1.5$. Here, KA is a function of temperature, and, as a temperature increases KA exponentially increases. Within the Vd region ($-5.0 \leq Vd \leq -1.5$), the amount of photoelectric current Iphoto that flows through the light receiving sensors 350P-1 to 350P-6 is substantially constant, and is proportional to an ambient light illuminance LX (hereinafter, Iphoto=LX×k). Therefore, an electric current that flows through the light receiving sensors 350P-1 to 350P-6 (graph (A)) and an electric current that flows the light shielding sensors 350D-1 to 350D-6 (graph (B)) both form a line having a slope KA (KA>0) within the range $-5.0 \leq Vd \leq -1.5$.

Here, when a bias is set so that Vd of the light shielding sensors 350D-1 to 350D-6 is equal to Vd of the light receiving sensors 350P-1 to 350P-6, that is, when an electric potential VSENSE of the wiring SENSE is set to just an intermediate value between an electric potential VVSH of the wiring VSH and an electric potential VVSL of the wiring VSL ((VVSH+VVSL)/2), the amount of thermoelectric current Ileak that flows through the light receiving sensors 350P-1 to 350P-6 completely coincides with the amount of thermoelectric current Ileak that flows through the light shielding sensors 350D-1 to 350D-6. At this time, because the amount of electric current that flows through the wiring VSH (=the amount of electric current that flows through the light receiving sensors 350P-1 to 350P-6) is Iphoto+Ileak, and the amount of electric current that flows through the wiring VSL (=the amount of electric current that flows through the light shielding sensors 350D-1 to 350D-6) is Ileak, the amount of electric current that flows through the wiring SENSE is Iphoto=LX×k on the basis of Kirchhoff's first law and, as a result, is proportional to the ambient light illuminance LX. Note that, in the present embodiment, the light receiving sensors are connected to a higher electric potential side and the light shielding sensors are connected to a lower electric potential side; however, of course, it may be configured in an opposite manner and the same conclusion may be achieved.

Figure 14:
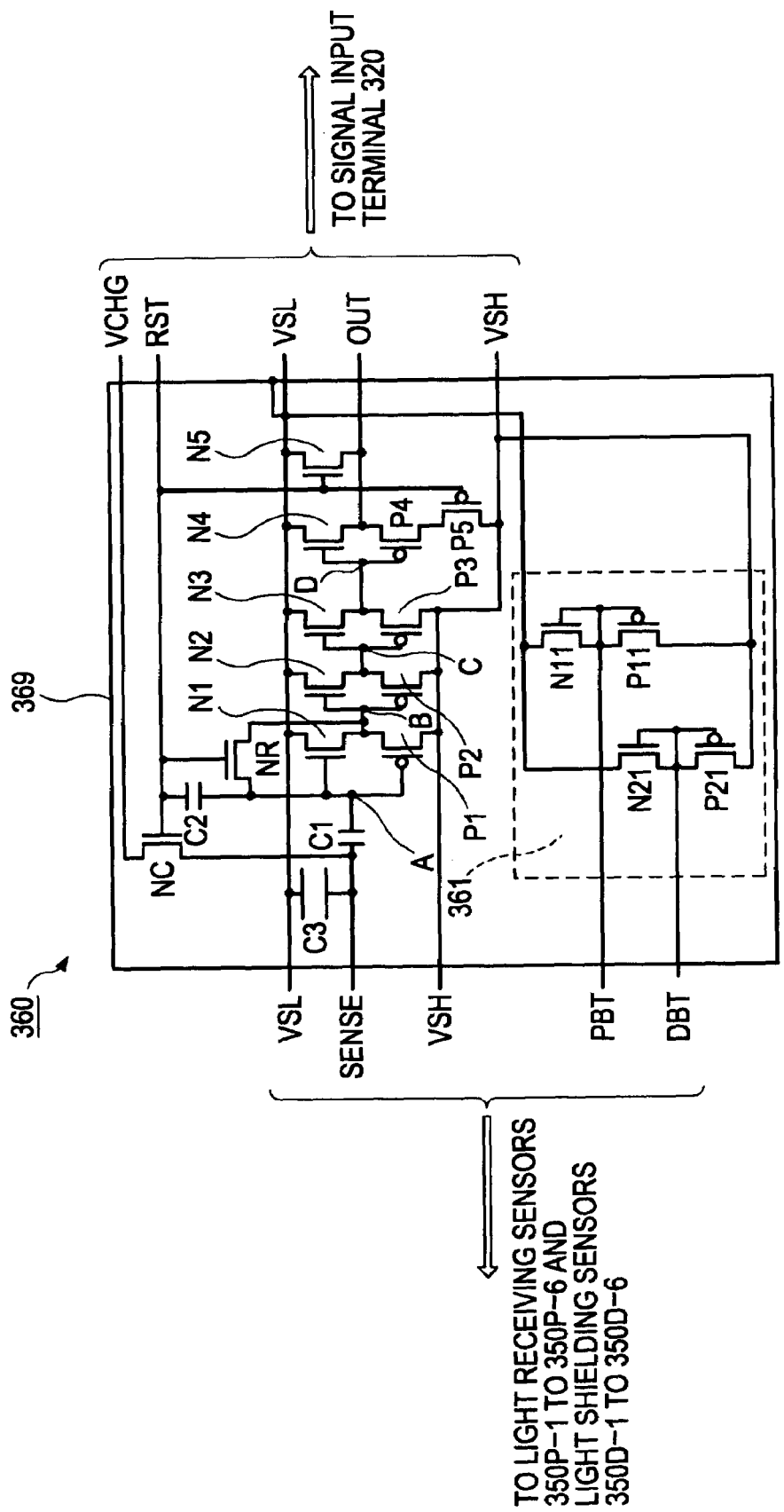
FIG. 14 is a circuit diagram of a detection circuit according to the first embodiment of the invention.

FIG. 14 is a circuit diagram of the detection circuit 360. The wiring VCHG, the wiring RST, the wiring VSL, the wiring VSH, the wiring OUT are connected to the signal input terminals 320, and the wiring VSL, the wiring VSH, the wiring SENSE, the wiring PBT and the wiring DBT are connected to the light receiving sensors 350P-1 to 350P-6 and the light shielding sensors 350D-1 to 350D-6. Here, the wiring VCHG, the wiring VSL and the wiring VSH are connected to a DC power supplied from the external power supply circuit 784, and the wiring VCHG is supplied with an electric potential VVCHG (=2.0 V), the wiring VSL is supplied with an electric potential VVSL (=0.0 V) and the wiring VSH is supplied with an electric potential VVSH (=5.0 V). Note that the electric potential VVSL of the wiring VSL is GND of the liquid crystal display device 910.

The wiring SENSE is connected to one end of a first capacitor C1 and one end of a third capacitor C3. In addition, the wiring SENSE is also connected to the drain electrode of an initial charge transistor NC. The other end of the third capacitor C3 is connected to the wiring VSL. The other end of the first capacitor C1 is connected to a node A. The source electrode of the initial charge transistor NC is connected to the wiring VCHG and is supplied with a power of electric potential VVCHG (=2.0 V). The gate electrode of the initial charge transistor NC is connected to the wiring RST. The node A is further connected to the gate electrode of a first N-channel transistor N1, the gate electrode of a first P-channel transistor P1 and the drain electrode of a reset transistor NR. The node A is further connected to one end of a second capacitor C2. The other end of the second capacitor C2 is connected to the wiring RST.

The drain electrode of the first N-channel transistor N1, the drain electrode of the first P-channel transistor P1 and the source electrode of the reset transistor NR are connected to a node B. The node B is further connected to the gate electrode of a second N-channel transistor N2 and the gate electrode of a second P-channel transistor P2. The drain electrode of the second N-channel transistor N2 and the drain electrode of the second P-channel transistor P2 are connected to a node C. The node C is further connected to the gate electrode of a third N-channel transistor N3 and the gate electrode of a third P-channel transistor P3. The drain electrode of the third N-channel transistor N3 and the drain electrode of the third P-channel transistor P3 are connected to a node D. The node D is further connected to the gate electrode of a fourth N-channel transistor N4 and the gate electrode of a fourth P-channel transistor P4. The drain electrode of the fourth N-channel transistor N4 and the drain electrode of the fourth P-channel transistor P4 are connected to the wiring OUT. The wiring OUT is further connected to the drain electrode of a fifth N-channel transistor N5. The gate electrode of the fifth N-channel transistor N5 and the gate electrode of a fifth P-channel transistor P5 are connected to the wiring RST. The drain electrode of the fifth P-channel transistor P5 is connected to the source electrode of the fourth P-channel transistor P4. The source electrodes of the first to fifth N-channel transistors N1 to N5 are connected to the wiring VSL and supplied with an electric potential VVSL (=0 V). In addition, the source electrodes of the first to third P-channel transistors P1 to P3 and the source electrode of the fifth P-channel transistor P5 are connected to the wiring VSH and supplied with an electric potential VVSH (=+5 V).

In addition, the detection circuit 360 is provided with a self-correction voltage circuit 361 that automatically corrects an electric potential applied to the wiring PBT and an electric potential applied to the wiring DBT on the basis of a threshold voltage (Vth) of a transistor. The self-correction voltage circuit 361 is configured so that the drain electrode and gate electrode of each of a sixth N-channel transistor N11 and a sixth P-channel transistor P11 both are connected to the wiring PBT, the drain electrode and gate electrode of each of a seventh N-channel transistor N21 and seventh P-channel transistor P21 both are connected to the wiring DBT, the source electrode of each of the sixth N-channel transistor N11 and the seventh N-channel transistor N21 is connected to the wiring VSL and supplied with an electric potential VVSL (=0 V), and the source electrode of each of the sixth P-channel transistor P11 and the seventh P-channel transistor P21 is connected to the wiring VSH and supplied with an electric potential VVSH (=+5 V).

In addition, the detection circuit 360 is entirely covered with a shield electrode 369 that is formed of an indium tin oxide (ITO) film that constitutes the pixel electrode 402-n-m. The shield electrode 369 is connected to through the wiring VSL to a GND electric potential of the liquid crystal display device 910, and functions as a shield against electromagnetic noise.

Here, in the present embodiment, the channel width of the first N-channel transistor N1 is 10 μm, the channel width of the second N-channel transistor N2 is 35 μm, the channel width of the third N-channel transistor N3 100 μm, the channel width of the fourth N-channel transistor N4 is 150 μm, the channel width of the fifth N-channel transistor N5 is 150 μm, the channel width of the sixth N-channel transistor N11 is 4 μm, the channel width of the seventh N-channel transistor N21 is 200 μm, the channel width of the first P-channel transistor P1 is 10 μm, the channel width of the second P-channel transistor P2 is 35 μm, the channel width of the third P-channel transistor P3 is 100 μm, the channel width of the fourth P-channel transistor P4 is 300 μm, the fifth P-channel transistor P5 is 300 μm, the channel width of the sixth P-channel transistor P11 is 200 μm, the channel width of the seventh P-channel transistor P21 is 4 μm, the channel width of the reset transistor NR is 2 μm, the channel width of the initial charge transistor NC is 50 μm, the channel lengths of all the N-channel transistors are 8 μm, the channel lengths of all the P-channel transistors are 6 μm, the mobilities of all the N-channel transistors are 80 cm²/Vsec, the mobilities of all the P-channel transistors are 60 cm²/Vsec, the threshold voltages (Vth) of all the N-channel transistors are +1.0 V, the threshold voltages (Vth) of all the P-channel transistors are −1.0 V, the capacitance of the first capacitor C1 is 1 pF, the capacitance of the second capacitor C2 is 100 fF, and the capacitance of the third capacitor C3 is 100 pF.

The wiring RST is, in a pulse wave having an amplitude of electric potential 0 to 5 V, maintained at a High electric potential (5 V) during a pulse length 100 μs every period of 510 ms and maintained at a Low electric potential (0 V) during the remaining 509.9 ms. When the wiring RST attains High (5 V) every 510 ms, the initial charge transistor NC and the reset transistor NR turn ON, the wiring SENSE is charged with an electric potential (2.0 V) of the wiring VCHG, and the node A and the node B are short-circuited. The first N-channel transistor N1 and the first P-channel transistor P1 form an inverter circuit, so that IN and OUT of the inverter circuit are short-circuited. At this time, the electric potentials of the node A and node B finally reach an electric potential VS expressed by the following equation (the detailed calculation may be, for example, referred to "CMOS Digital Integrated Circuits", Third Edition, P206, written by Kang Leblebici).

$$VS = \frac{Vthn + \sqrt{\frac{WpLn\mu_p}{WnLp\mu_n}} \times (VVSH - VVSL + Vthp)}{\left(1 + \sqrt{\frac{WpLn\mu_p}{WnLp\mu_n}}\right)}$$

Here, Wn is a channel width of the first N-channel transistor N1, Ln is a channel length of the first N-channel transistor N1, μn is a mobility of the first N-channel transistor N1, Vthn is a threshold voltage of the first N-channel transistor N1, Wp is a channel width of the first P-channel transistor P1, Lp is a channel length of the first P-channel transistor P1, μp is a mobility of the first P-channel transistor P1, and Vthp is a threshold voltage of the first P-channel transistor P1, so that VS=2.5 (V) is obtained in the present embodiment. Note that, when the wiring RST is at High (5 V), the fifth N-channel transistor N5 turns ON and the fifth P-channel transistor P5 turns OFF, so that the wiring OUT is applied with 0 V.

As the wiring RST attains Low (0 V) after 100 μs has elapsed, the reset transistor NR turns OFF and the node A and the node B are electrically isolated. At this time, the inverter circuit formed of the first N-channel transistor N1 and the first P-channel transistor P1 outputs an electric potential higher than that of VS to the node B when the electric potential of the node A is lower than VS, and outputs an electric potential lower than VS to the node B when the electric potential of the node A is higher than VS. The pair of second N-channel transistor N2 and second P-channel transistor P2 and the pair of third N-channel transistor N3 and third P-channel transistor P3 also respectively form inverter circuits, and similarly each output an electric potential higher than VS when the electric potential of an input stage is lower than VS and output an electric potential lower than VS when the electric potential of an input stage is higher than VS. At this time, a difference between the electric potential of an output stage and VS increases as compared with a difference between the electric potential of an input stage and VS, and approaches the electric potential VVSH (=+5 V) of the wiring VSH or the electric potential VVSL (=0 V) of the wiring VSL. As a result, when the electric potential of the node A is lower than VS, the node D is applied with substantially the electric potential VVSH (=+5 V) of the wiring VSH. On the other hand, when the electric potential of the node A is higher than VS, the node D is applied with substantially the electric potential VVSL (=0 V) of the wiring VSL. The pair of fourth N-channel transistor N4 and fifth N-channel transistor N5 and the pair of fourth P-channel transistor P4 and fifth P-channel transistor P5 each form a NOR circuit and, during a period when the electric potential of wiring RST is at Low (0 V), outputs Low (0 V) to the wiring OUT when the node D is applied with High (+5 V) and outputs High (+5 V) to the wiring OUT when the node D is applied with Low (0 V). That is, during a period when the wiring RST is at Low (0 V), the output to the wiring OUT is Low (0 V) when the electric potential of the node A is lower than VS, whereas the output to the wiring OUT is High (+5 V) when the electric potential of the node A is higher than VS.

As described above, the wiring RST attains Low (0 V) and then thee reset transistor NR turns OFF and, as a result, the node A and the node B are electrically isolated; however, at the same time, the electric potential of the node A reduces simultaneously with the electric potential of the wiring RST by the coupling of the second capacitor C2. Here, When the capacitance CC1 (=1 pF) of the first capacitor C1 is sufficiently greater than the capacitance CC2 (=100 fF) of the second capacitor C2 and the capacitance between the gate and drain of each of the first N-channel transistor N1, the first P-channel transistor P1 and the reset transistor NR (in the present embodiment, all capacitances are 10 fF or below), and when the product of a writing impedance of the reset transistor NR and the capacitance of the first capacitor C1 (in the present embodiment, about 1 μs) is sufficiently longer than the fall time of the electric potential of the wiring RST (in the present embodiment, 100 ns), the electric potential of the node A (hereinafter, referred to as VA(t)) may be expressed by the following equation when the wiring RST attains Low (0 V) (hereinafter, this time is defined as t=0).

$$VA(t=0) = VS - \frac{CC2}{CC1} \times (VVSH - VVSL)$$

In the present embodiment, VA(t=0) 2.0 V. At this time, the bias applied to the light receiving sensor 350P-1 is Vd=−3.0 V, and the bias applied to the light shielding sensor 350D-1 is Vd=−2.0 V. As is apparent from the description with reference to FIG. 13, at this time, a difference in the amount of thermoelectric current Ileak between the PIN diodes forming the light receiving sensor 350P-1 and the PIN diodes forming the light shielding sensor 350D-1 may be expressed as KA×1.0. Thus, an electric current, which is obtained by adding the amount of photoelectric current Iphoto corresponding to ambient light that is irradiated to the light receiving sensor 350P-1 to the amount of electric current KA×1.0, flows through the wiring SENSE. Here, when KA<<Iphoto, the amount of electric current that flows through the wiring SENSE may be approximated to Iphoto only, so that the influence of thermoelectric current may be removed. In the present embodiment, KA at the temperature of 70° C., which is the upper limit operating temperature, is equal to Iphoto at the illuminance of 10 lux. Accordingly, when the illuminance of ambient light is 100 lux or above, it is possible to effectively remove thermal leakage within the range of operating temperature.

Here, as described above, under this bias condition, ambient light is proportional to the illuminance LX of ambient light that illuminates the light receiving sensor 350P-1 and does not depend on Vd, so that the relationship between ambient light and Iphoto is Iphoto=LX·k (k is a constant coefficient). When the wiring RST attains Low (0 V), the node A is in a floating state, so that, when the capacitance CC2 of the second capacitor C2 and the capacitance between the gate and source of each of the first N-channel transistor N1 and the first P-channel transistor P1 are ignored, the effective capacitance is substantially the capacitance CC3 of the third capacitor C3 only. Thus, the electric potential VSENSE of the wiring SENSE may be changed into the following equation.

$$VSENSE(t) = VVCHG + \frac{LX \times k}{CC3} \times t$$

Note that, here, additive capacitances of the light receiving sensor 350P-1, the light shielding sensor 350D-1 and connecting wirings are ignored for description. These additive capacitances may be added to the above CC3. In addition, when the additive capacitances of the light receiving sensor 350P-1, the light shielding sensor 350D-1 and the connecting wirings are sufficiently large, the third capacitor C3 need not be provided. Thus, the lower limit of the capacitance CC3 may be determined from the additive capacitances of the light receiving sensor 350P-1, the light shielding sensor 350D-1 and the connecting wirings.

As VSENSE(t) varies, VA(t) also varies by the same amount because of capacitive coupling. Thus, the electric potential VA of the node A may be expressed by the following equation.

$$VA(t) = VS - \frac{CC2}{CC1} \times (VVSH - VVSL) + \frac{LX \times k}{CC3} \times t$$

Here, time t0 at which VA(t)=VS may be expressed by the following equation.

$$t0 = \frac{CC2 \times CC3}{CC1 \times LX \times k} \times (VVSH - VVSL)$$

That is, at time t0 the output OUT is inverted from Low (0 V) to High (5 V), and, after the time t0, the illuminance LX of ambient light is easily determined.

When the wiring RST is at Low (0 V), the node A enters a floating state. Then, electromagnetic noise advances here to change the electric potential of the node A, the detection circuit 360 malfunctions. Thus, it is extremely important to prevent electromagnetic noise. For this reason, the shield electrode 369 is arranged.

In the meantime, a PIN diode or a PN diode having a lateral structure as in the case of the present configuration has a problem in which the amount of photoelectric current Iphoto varies in response to electric field formed in a vertical direction. As is specifically described taking the present embodiment for instance, the electric potentials (hereinafter, referred to as VPBT) of the transparent electrodes 612P-1 to 612P-6 and the backlight light shielding electrodes 611P-1 to 611P-6, which are connected to the wiring PBT, influence the characteristics of the light receiving sensors 350P-1 to 350P-6, and the electric potential (hereinafter, referred to as VDBT) of the transparent electrodes 612D-1 to 612D-6 and the backlight light shielding electrode 611P-1 to 611P-6, which are connected to the wiring DBT, influence the characteristics of the light shielding sensors 350D-1 to 350D-6.

Figure 15:
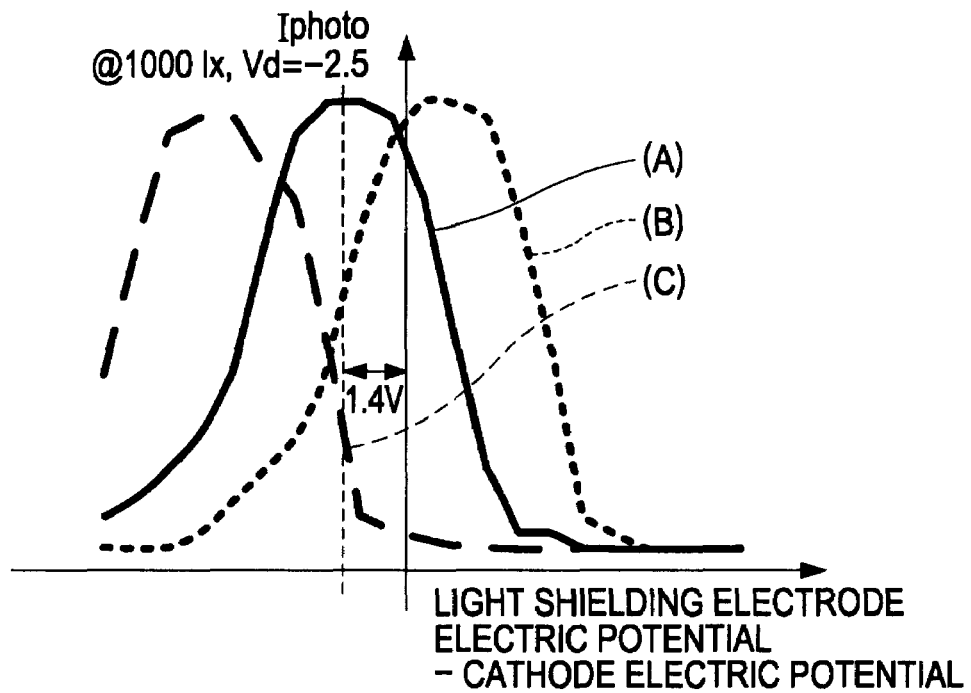
FIG. 15 is a graph of an electric current of a PIN diode and an electric potential between a light shielding electrode and a cathode electrode according to the first embodiment of the invention.

FIG. 15 is a graph that shows the characteristics of diodes forming the light receiving sensors 350P-1 to 350P-6 and the light shielding sensors 350D-1 to 350D-6 when the abscissa axis represents a difference in electric potential between the light shielding electrode (and the transparent electrode) and the cathode electrode, and the ordinate axis represents an electric current that flows between the anode and cathode of the PIN diode under the conditions that the temperature is 23° C., the bias vd is −2.5 V, and ambient light has 1000 lux. In the present embodiment, the abscissa axis represents VPBT-VVSH in the case of the light receiving sensors 350P-1 to 350P-6 and represents VDBT-VSENSE in the case of the light shielding sensors 350D-1 to 350D-6.

The solid line (A) is the result of a sample, of which a voltage value in the abscissa axis at a peak electric current, that indicates a median among a plurality of samples measured. Similarly, the dotted line (B) is the result of a sample, of which a voltage value in the abscissa axis at a peak electric current, that indicates a maximum value among the plurality of samples measured. Similarly, the broken line (C) is the result of a sample, of which a voltage value in the abscissa axis at a peak electric current, that indicates a minimum value among the plurality of samples measured. It proves that any one of them has a peak at a certain appropriate voltage (hereinafter, a difference in electric potential between the light shielding electrode (and the transparent electrode) and the cathode electrode, at which the photoelectric current takes a peak, is termed as VMAX). This is because the following reasons. When the difference in electric potential between the light shielding electrode (and the transparent electrode) and the cathode electrode is an appropriate voltage, the light receiving portion (which may be regarded as the light receiving portion 350P-1I and the light receiving portion 350D-1I in FIG. 8) of the PIN junction diode is depleted and carriers are then excited by light over the entire region. On the other hand, when the difference in electric potential between the light shielding electrode (and the transparent electrode) and the cathode electrode is larger than the appropriate voltage, the light receiving portion becomes an N-channel type, and when the difference in electric potential is smaller than the appropriate voltage, the light receiving portion becomes a P-channel type. Thus, the width of a depleted layer becomes narrow and, as a result, it limits an area in which carriers are excited by light. Accordingly, in order to sufficiently obtain photoelectric current, it is necessary to appropriately control VPBT and VDBT so as to be placed at the point of VMAX. As is apparent from the graph (A) shown in FIG. 15, in a median of production tolerance, the electric potential of the light shielding electrode and the transparent electrode is preferably about 1.4 V lower than an electric potential applied to the cathode electrode. However, as is apparent from comparison among the graph (A), the graph (B) and the graph (C), actually the appropriate electric potential VMAX is slightly deviated because of production tolerance. This is a phenomenon that occurs because defect levels in a polysilicon thin film, fixed electric charges at the interface of the base insulating film and the gate insulating film, or the like, become uneven in the manufacturing process.

Figure 16:
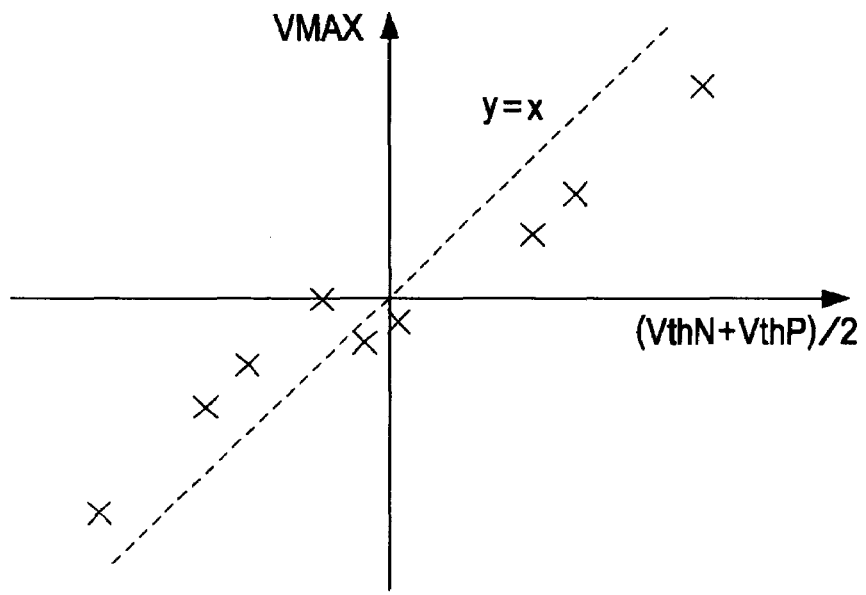
FIG. 16 is a scatter diagram that indicates characteristic correlation between a thin-film transistor and a PIN diode according to the embodiment of the invention.

FIG. 16 is a scatter diagram that indicates characteristic correlation between a thin-film transistor and a PIN diode, which are formed on the same substrate. The abscissa axis represents an average of a threshold voltage (VthN) of the N-channel thin-film transistor and a threshold voltage (VthP) of the P-channel thin-film transistor, and the ordinate axis represents an appropriate electric potential VMAX that maximizes a photoelectric current that flows through the PIN diode. As is apparent from FIG. 16, the threshold value of the thin-film transistor and the appropriate electric potential VMAX that maximizes a photoelectric current that flows through the PIN diode have a strong positive correlation. In the present embodiment, as shown in the graph (A) of FIG. 15, the photoelectric current exhibits a maximum value (VMAX) when the light shielding electrode (and the transparent electrode) is about 1.4 V lower than the electric potential of the cathode electrode. At this time, in an average state of production tolerance, the threshold voltage (VthN) of the N-channel thin-film transistor is +1.0 V, and the threshold voltage (VthP) of the P-channel thin-film transistor is −1.0 V. In the production tolerance, when the average of VthN and VthP deviates 1 V, VMAX also deviates 1 V, thus substantially exhibiting a positive correlation of y=x (dotted line).

In view of the above, in the present embodiment, the self-correction voltage circuit 361 is used to self-correct a voltage on the basis of the threshold value (Vth) of the thin-film transistor and then apply a voltage to the wiring PBT and the wiring DBT. In the production tolerance of the present embodiment, the average value VthN=+1.0 and the average value VthP=−1.0. In this state, the self-correction voltage circuit 361 applies the wiring PBT with a voltage of 3.6 V and applies the wiring DBT with a voltage of 1.4 V. In the light receiving sensors 350P-1 to 350P-6, each of the cathodes is connected to the wiring VSH and is applied with a voltage of 5.0 V, so that a difference in electric potential between the backlight light shielding electrodes 611P-1 to 611P-6 and transparent electrode 612P-1 and the cathodes becomes −1.4 V. This becomes an optimized electric potential (VMAX) that can obtain photoelectric current. When the characteristics of the transistors vary because of production tolerance and, therefore, for example, VthN=+1.5 and VthP=−0.5, the wiring PBT is applied with a voltage of 4.1 V and the wiring DBT is applied with a voltage of 1.9 V. Similarly, for example, when VthN=+0.5 and VthP=−1.5, the wiring PBT is applied with a voltage of 3.1 V and the wiring DBT is applied with a voltage of 0.9 V. In any cases, as the threshold values of the transistors vary, electric potentials applied to the wiring PBT and the wiring DBT also vary with the variation of the threshold values. Thus, it is possible to always obtain a substantially maximum photoelectric current.

Figure 17:
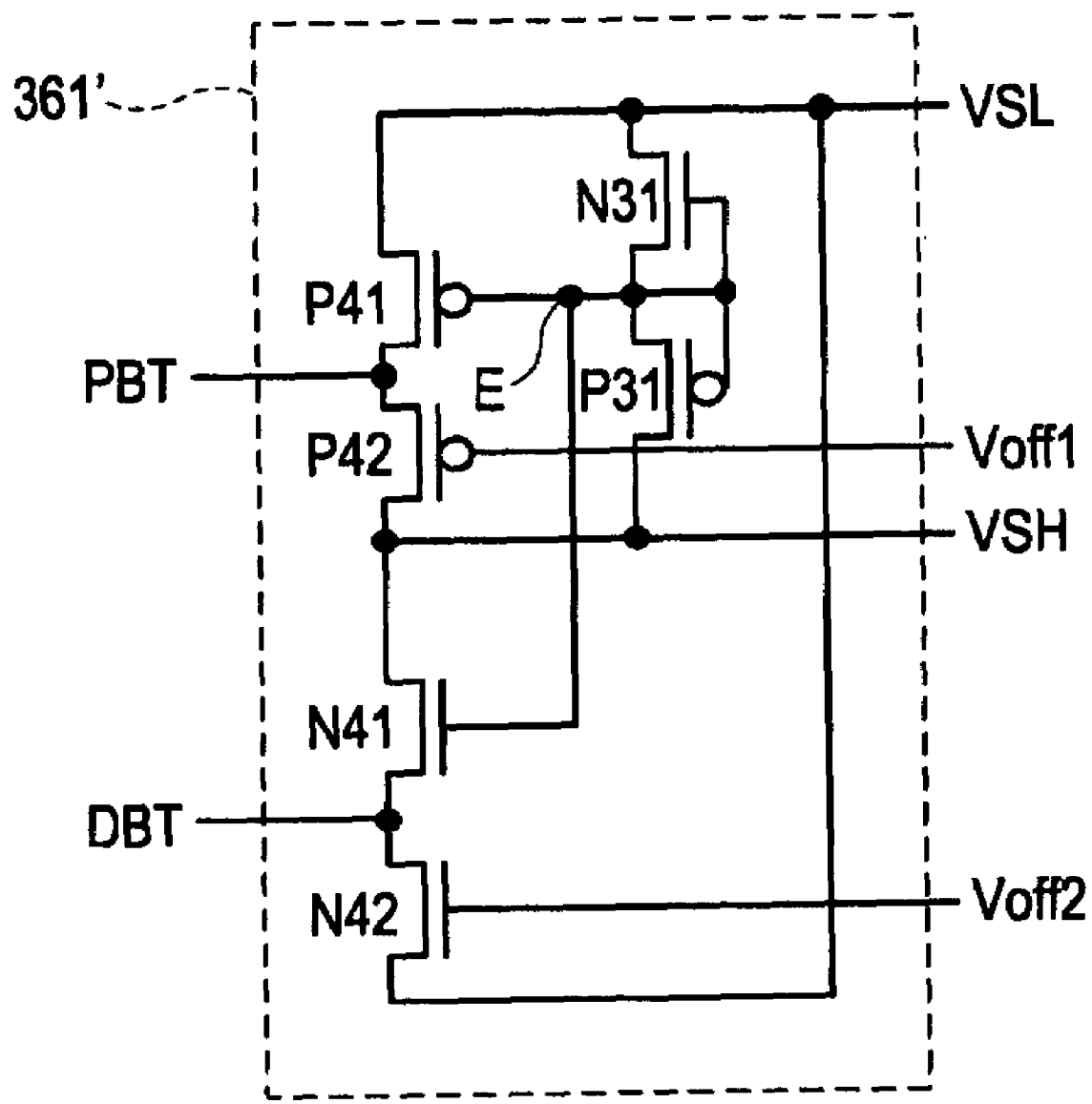
FIG. 17 is a circuit diagram of a second self-correction voltage circuit according to another configuration example of the first embodiment of the invention.

FIG. 17 is a circuit diagram that shows a second self-correction voltage circuit 361', which is another configuration of the self-correction voltage circuit 361 shown in FIG. 16. The gate electrode and drain electrode of an eighth N-channel transistor N31 and the gate electrode and drain electrode of an eighth P-channel transistor P31 all are connected to a node E. In addition, the node E is also connected to the gate electrode of a ninth P-channel transistor P41 and the gate electrode of a ninth N-channel transistor N41. The source electrode of the ninth P-channel transistor P41 is connected to the wiring PBT, and the drain electrode thereof is connected to the wiring VSL. In addition, the drain electrode of a tenth P-channel transistor P42 is connected to the wiring PBT, the source electrode thereof is connected to the wiring VSH, and the gate electrode is connected to a regulated power supply wiring Voff1. The source electrode of the ninth N-channel transistor N41 is connected to the wiring DBT, and the drain electrode thereof is connected to the wiring VSH. The drain electrode of a tenth N-channel transistor N42 is connected to the wiring DBT, the source electrode thereof is connected to the wiring VSL, and the gate electrode thereof is connected to a regulated power supply wiring Voff2. The regulated power supply wiring Voff1 and the regulated power supply wiring Voff2 are set to powers supplied from the external power supply circuit 784 through the signal input terminal 320. The regulated power supply wiring Voff1 is set to 3.9 V, and the regulated power supply wiring Voff2 is set to 1.1 V. Here, the channel width of the eighth N-channel transistor N31 is 10 μm, the channel width of the eighth P-channel transistor P31 is 10 μm, the channel width of the ninth N-channel transistor N41 is 100 μm, the channel width of the tenth N-channel transistor N42 is 100 μm, the channel width of the ninth P-channel transistor P41 is 100 μm, the channel width of the tenth P-channel transistor P42 is 100 μm, the channel lengths of all the N-channel transistors are 8 μm, the channel lengths of all the P-channel transistors are 6 μm, the mobilities of all the N-channel transistors are 80 cm$^2$/Vsec, and the mobilities of all the P-channel transistors are 60 cm$^2$/Vsec. As configured above, the relationship between a voltage output to the wiring DBT and an voltage output to the wiring PBT from the second self-correction voltage circuit 361' and threshold voltages (Vth) of the thin-film transistors is completely the same as that of the self-correction voltage circuit 361 shown in FIG. 14.

In comparison with the configuration of the self-correction voltage circuit 361 shown in FIG. 14, the configuration of the second self-correction voltage circuit 361' shown in FIG. 17 is advantageously able to adjust a voltage output to the wiring DBT and a voltage output to the wiring PBT by adjusting electric potentials applied to the regulated power supply wiring Voff1 and the regulated power supply wiring Voff2 without changing the active matrix substrate 101. On the other hand, because the number of elements, the number of wirings, and the number of terminals increase, the configuration is disadvantageous in terms of circuit area. It may be selectively determined in consideration of advantages and disadvantages to employ any one of them. In addition, the aspects of the invention are not limited to these circuit configurations. Other than these configurations, any existing voltage circuits may be used instead of the self-correction voltage circuit 361. In addition, the wiring DBT and the wiring PBT may be connected through the signal input terminal 320 to the external power supply circuit 784 and supplied with an appropriate electric potential from the external power supply circuit 784. In this case, when the setting value of an electric potential output from the external power supply circuit 784 is written into an EEPROM, or the like, for each product, a control may be performed for product tolerance.

Note that, in this embodiment, the power supply wiring VSH and the power supply wiring VSL connected to the light receiving sensors 350P-1 to 350P-6 and the light shielding sensors 350D-1 to 350D-6 are also used as a power supply for driving the detection circuit 360, but these may be other power supply wirings. As the thus configured, on one hand, the number of wirings and terminals increases, on the other hand, it is advantageous in that operation noise of the detection circuit 360 hardly influences the light receiving sensors 350P-1 to 350P-6 and the light shielding sensors 350D-1 to 350D-6.

In the present embodiment, the central processing circuit 781 monitors a signal of the terminal OUT and initially acquires a discrete value V10 from inverted time t0. The discrete value V10 is sampled given times, and the average value V10_ of these sampled discrete values V10 is acquired. The reference table 785 is referred using V10_, and an appropriate voltage setting value V20, corresponding to V10_, of the backlight unit 926 is acquired. The central processing circuit 781 transmits the value V20 to the external power supply circuit 784 to thereby change the luminance of the backlight unit 926. In this manner, the luminance of the liquid crystal display device 910 in complete white display varies. By suppressing an excessive luminance for a user, it is possible to improve visibility while suppressing an increase in power consumption.

Figure 18:
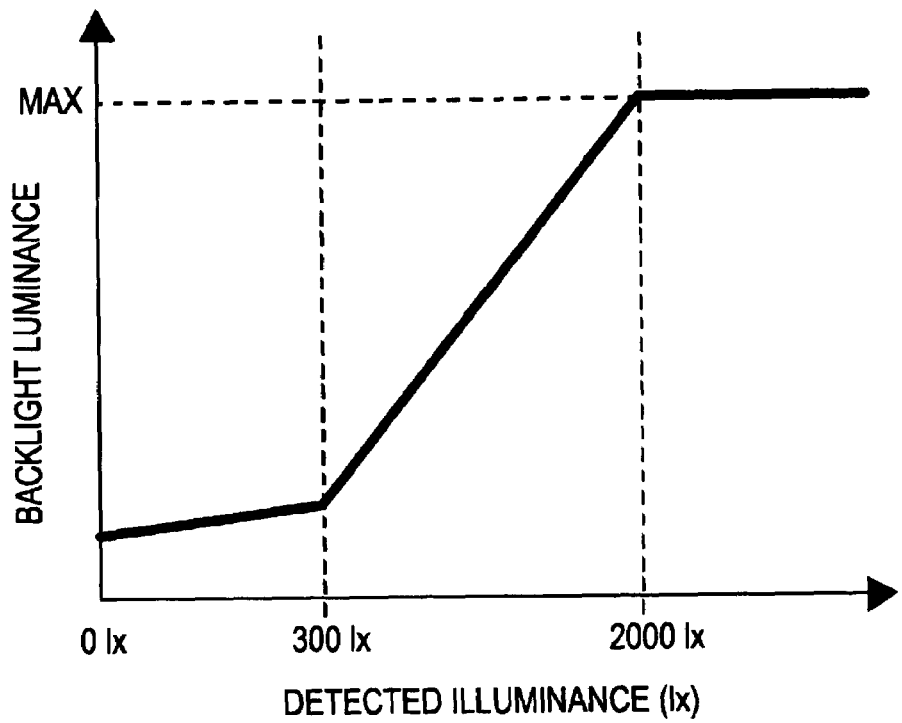
FIG. 18 is a setting graph of a detected illuminance of ambient light and a backlight luminance according to the embodiment of the invention.

In the present embodiment, the relationship between the detected illuminance of ambient light and the luminance of backlight is set as shown in FIG. 18. The illuminance of backlight is gently increased to the detected illuminance 300 (lux), and the illuminance is relatively abruptly increased from 300 lux or above. At the detected illuminance 2000 lux, the luminance becomes maximum (MAX) and maintains the same state thereafter. As the thus set, surrounding is extremely dark when ambient light is 300 lux or below, and backlight is suppressed to such a degree that a user does not feel too bright when the pupil of the user is enlarged, and, in the range where ambient light of 300 lux to 2000 lux is reflected on the liquid crystal panel, the luminance is sharply increased in response to the brightness of the surrounding, thus making it possible to not decrease the visibility.

Figure 19:
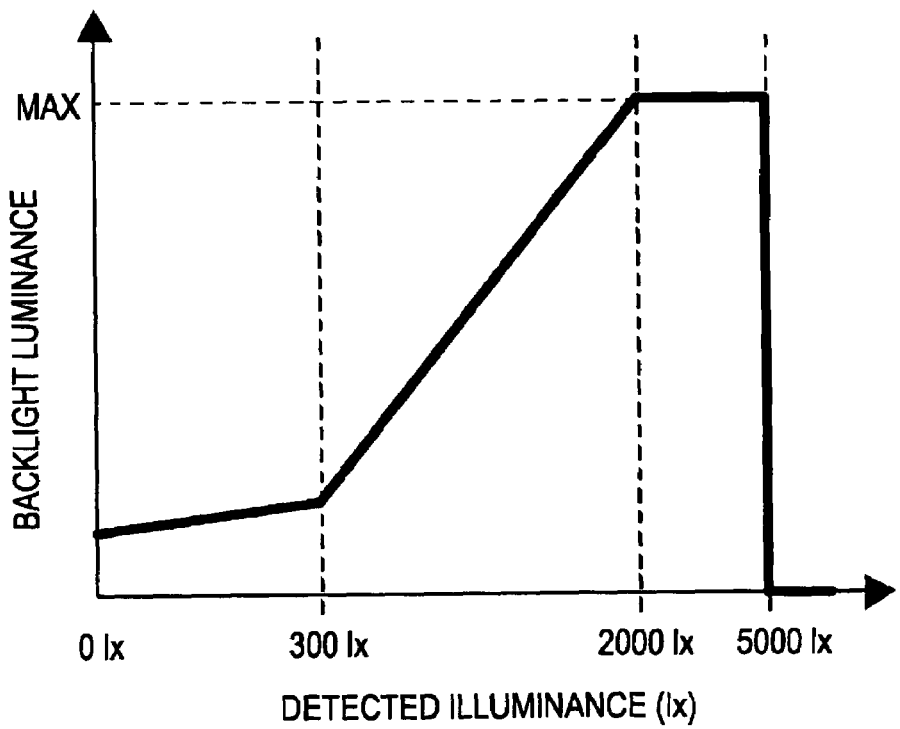
FIG. 19 is a setting graph of a detected illuminance of ambient light and a backlight luminance for a transflective liquid crystal display device.

On the other hand, when not a transmissive liquid crystal as in the case of the present embodiment but a transflective liquid crystal is used, it may be configured as shown in FIG. 19. It has the same characteristics to an ambient light illuminance 5000 lux; however, when the illuminance is equal to or above 5000 lux, it exhibits a sufficient visibility with a reflection portion only, so that the backlight is completely turned OFF. Because it is configured to be able to save power consumption, the battery driving time of an electronic apparatus that mounts the transflective liquid crystal dramatically increases, especially when the electronic apparatus is used outside.

Of course, this control curve is one example and, in response to applications, any control curves may be set. For example, in order to suppress a flicker, the curve may have a hysteresis, or the like. In addition, the luminance is adjusted not in every measurement, but, after multiple measurements are made, the luminance may be then adjusted by taking an average or a median.

When the light receiving sensors 350P-1 to 350P-6 and the light shielding sensors 350D-1 to 350D-6 are formed of photo transistors as well, basically, as described in the present embodiment, voltages applied to electrodes that overlap the light receiving sensors 350P-1 to 350P-6 and the light shielding sensors 350D-1 to 350D-6 in plan view are preferably separately optimized. Because the size of depleted layer of the photo transistor is also influenced by the electrode that overlaps the photo transistor in plan view.

Second Embodiment

Figure 20:
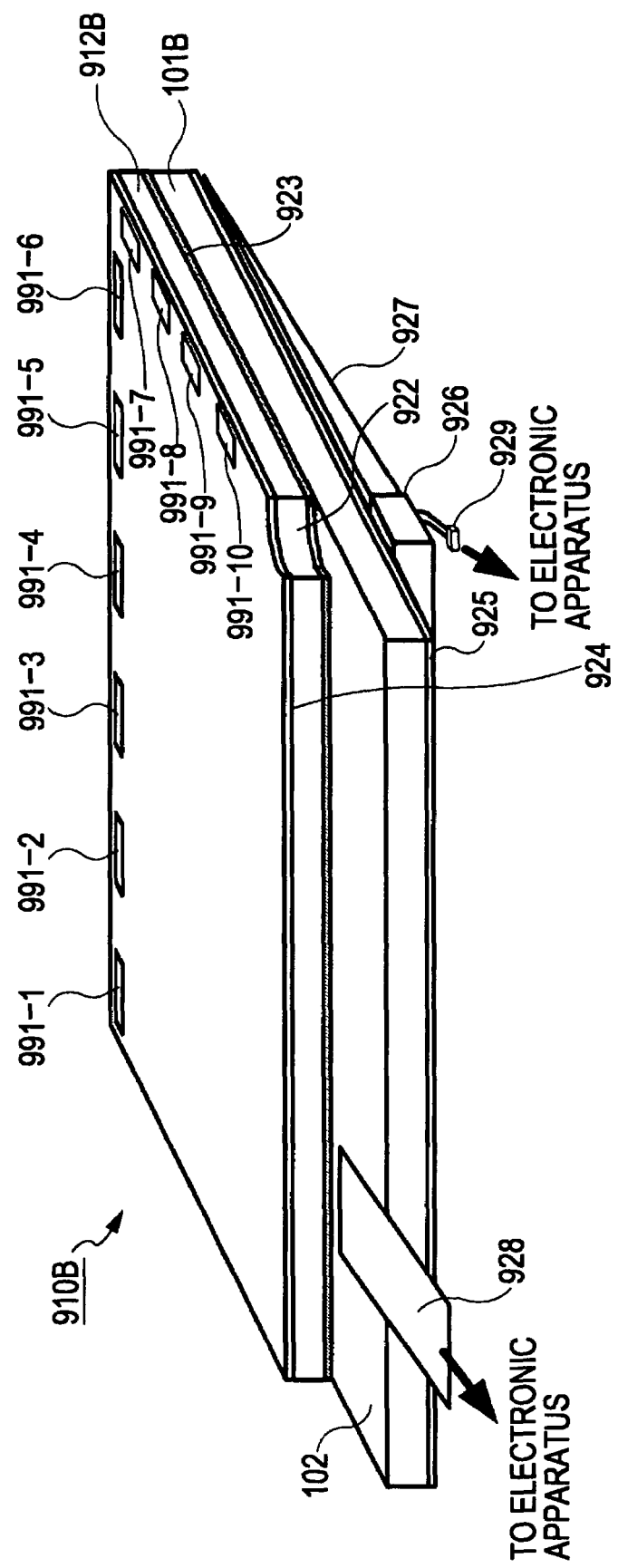
FIG. 20 is a perspective view of a liquid crystal display device according to a second embodiment of the invention.

FIG. 20 is a perspective configuration diagram (partly cross-sectional view) of a liquid crystal display device 910B according to the second embodiment and is alternative to the liquid crystal display device 910 described with reference to FIG. 1 in the first embodiment.

Hereinafter, a difference from the liquid crystal display device 910 shown in FIG. 1 in the first embodiment will be described. In the present embodiment, in place of the light receiving opening portions 990-1 to 990-6, ten light receiving opening portions 991-1 to 991-10 are arranged. Here, the light receiving opening portions 991-1 to 991-6 are placed at peripheral portions that is far and opposite the extended portion 102, and the light receiving opening portions 991-7 to 991-10 are placed at a side of a peripheral portion that intersects the extended portion 102. In addition, in place of the active matrix substrate 101, an active matrix substrate 101B is used, and the opposite substrate 912 is replaced by an opposite substrate 912B. Here, the opposite substrate 912B has the same configuration as the opposite substrate 912 except that the thickness of the opposite substrate 912B is 0.25 mm. Other portions are not different from those shown in FIG. 1 in the first embodiment, so that the same reference numerals are assigned and the description is omitted.

Figure 21:
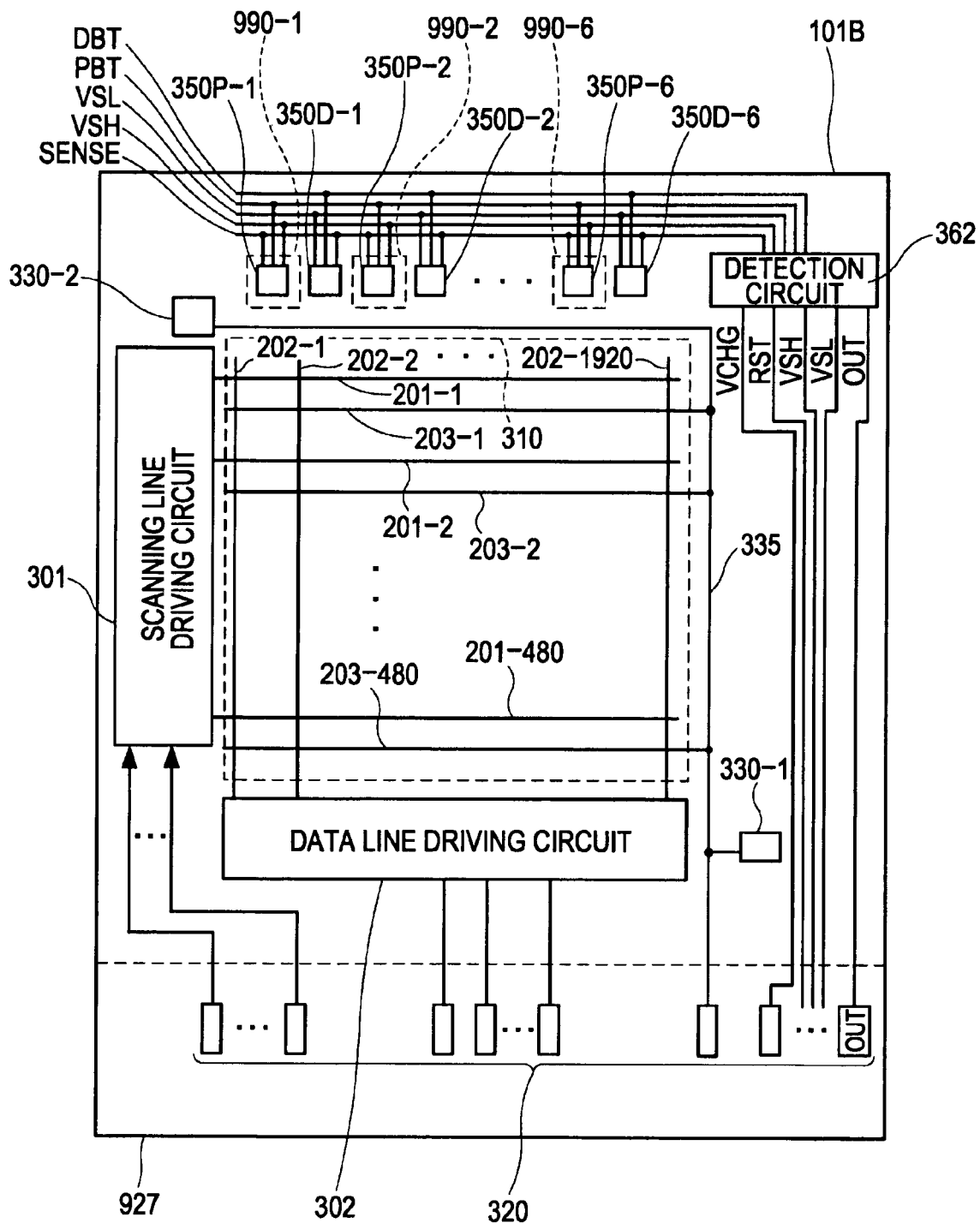
FIG. 21 is a block diagram of an active matrix substrate according to the second embodiment of the invention.

FIG. 21 is a block diagram of the active matrix substrate 101B according to the second embodiment and is alternative to the active matrix substrate 101 described with reference to FIG. 2 in the first embodiment. Hereinafter, a difference from the active matrix substrate 101 shown in FIG. 2 in the first embodiment will be specifically described. In the present embodiment, there is no wiring DBT or wiring PBT, the light receiving sensors 350P-1 to 350P-6 are replaced by light receiving sensors 351P-1 to 351P-10, and the light shielding sensors 350D-1 to 350D-6 are replaced by light shielding sensors 351D-1 to 351D-10. Here, the light receiving sensors 351P-1 to 351P-6 and the light shielding sensors 351D-1 to 351D-10 are arranged at the same side as that of the peripheral portion at which the light receiving opening portions 991-1 to 991-6, and the light receiving sensors 351P-1 to 351P-6 are arranged so as to overlap the light receiving opening portions 991-1 to 991-6 in plan view. In addition, the light receiving sensors 351P-7 to 351P-10 and the light shielding sensors 351D-7 to 351D-10 are arranged at the same side as that of the peripheral portion at which the light receiving opening portions 991-1 to 991-6 are provided, and the light receiving sensors 351P-1 to 351P-6 are arranged so as to overlap the light receiving opening portions 991-1 to 991-6 in plan view. The light receiving sensors 351P-1 to 351P-10 are connected to the wiring SENSE and the wiring VSH, the light shielding sensors 351D-1 to 351D-10 are connected to the wiring VSL, the wiring SENSE and the wiring VCHG. The detection circuit 360 is replaced by a detection circuit 362. Other than the above, there is no difference from those of the first embodiment, so that the same reference numerals are assigned and the description is omitted. In addition, in the present embodiment, an electric potential applied to the wiring VSH is 5.0 V, an electric potential applied to the wiring VSL is 0.0 V, an electric potential applied to the wiring VCHG is 2.0V, a signal applied to the wiring RST is a pulse wave having an amplitude of electric potential 0 to 5 V and is maintained at a High electric potential (5 V) during a pulse length 100 μs every period of 510 ms and maintained at a Low electric potential (0 V) during the remaining 509.9 ms. These are also not different from those of the first embodiment.

Figure 22:
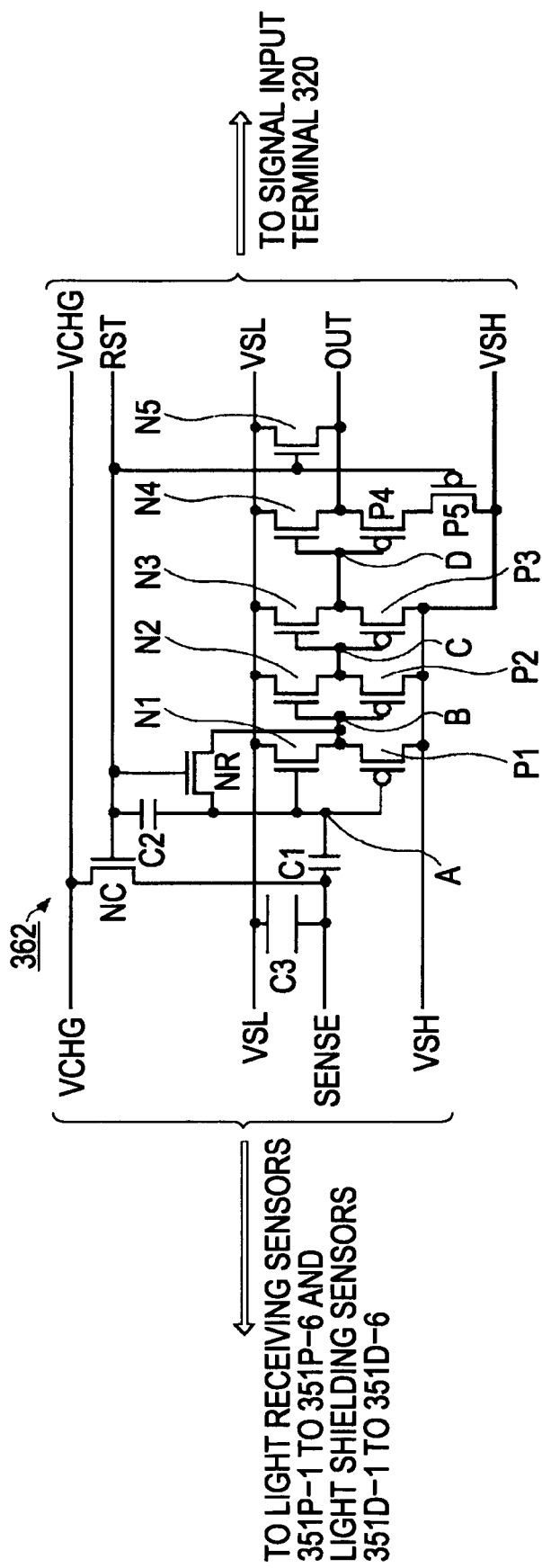
FIG. 22 is a circuit diagram of a detection circuit according to the second embodiment of the invention.

FIG. 22 is a circuit diagram of the detection circuit 362, and a difference from the detection circuit 360 shown in FIG. 14 in the first embodiment will be described. In the present embodiment, there is no wiring DBT or wiring PBT, and, in addition, there is no self-correction voltage circuit 361. Instead, the VCHG is directly output to the light shielding sensors 351D-1 to 351D-10. Moreover, there is no shield electrode 369. In this manner, in comparison with the first embodiment, an additional capacitance of the circuit is reduced and, as a result, the circuit is operable at higher speed with more accuracy; however, on the other hand, electromagnetic noise is reduced. Thus, whether to provide a shield electrode 369 may be determined on the basis of the magnitude of electromagnetic noise depending on a position, or the like, where the detection circuit is arranged. The connection and capacitance of each of the first capacitor C1, the second capacitor C2 and the third capacitor C3, and the configuration, size, mobility and setting of threshold voltage (Vth) of each of the initial charge transistor NC, the initial charge transistor NC, the first to fifth N-channel transistors N1 to N5 and the first to fifth P-channel transistors P1 to P5 all are the same as those of the first embodiment, so that the description is omitted.

Figure 23:
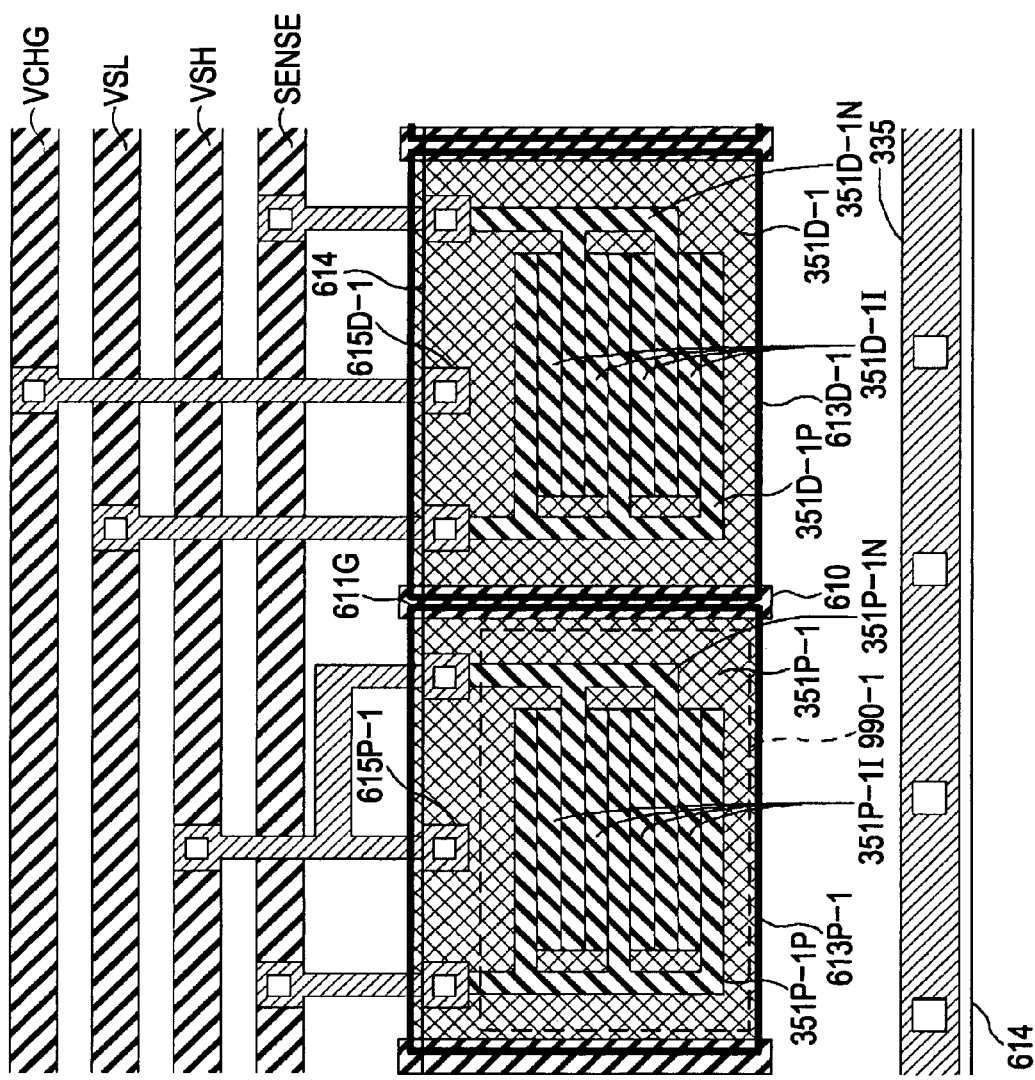
FIG. 23 is a plan view of a light receiving sensor and a light shielding sensor according to the second embodiment of the invention.

FIG. 23 is an enlarged plan view of a portion around the light receiving sensor 351P-1 (first optical sensor) and the light shielding sensor 351D-1 (first optical sensor). A description will be made in comparison with FIG. 8 of the first embodiment. The light receiving sensor 351P-1 overlaps the light receiving opening portion 990-1 in plan view, and ambient light will be irradiated to the light receiving sensor 351P-1. The light receiving sensor 351P-1 includes a light receiving portion 351P-1I, an anode region 351P-1P and a cathode region 351P-1N. The light shielding sensor 351D-1 does not overlap the light receiving opening portion 990-1 in plan view, and includes a light receiving portion 351D-1I, an anode region 351D-1P and a cathode region 351D-1N. The configuration, size, and connection destination of each of the light receiving portion 351P-1I, the anode region 351P-1P, the cathode region 351P-1N, the light receiving portion 351D-1I, the anode region 351D-1P and the cathode region 351D-1N do not differ from those of each of the light receiving portion 350P-1I, the anode region 350P-1P, the cathode region 350P-1N, the light receiving portion 350D-1I, the anode region 350D-1P and the cathode region 350D-1N in the first embodiment, so that the description is omitted. In the present embodiment, a backlight light shielding electrode 614P-1, which overlaps the light receiving sensor 351P-1, is connected through an intermediate electrode 616P-1 to the wiring VSH, and a backlight light shielding electrode 614D-1, which overlaps the light shielding sensor 351D-1, is connected through an intermediate electrode 616D-1 to the wiring VCHG. In addition, the transparent electrode 615, which overlaps the light receiving sensor 351P-1, also overlaps the light shielding sensor 351D-1 and are not separated from each other. Thus, there is no transparent electrode gap 612G described in the first embodiment. The common potential wiring 335 is arranged on a side adjacent to the display area 310 relative to the light receiving sensor 351P-1 and the light shielding sensor 351D-1, and the transparent electrode 614 is applied with a common electric potential. In the present embodiment, the common potential wiring 335 is applied with a DC electric potential of 4.0 V. Because the light receiving sensors 351P-2 to 351P-10 have the same configuration as the light receiving sensor 351P-1, and the light shielding sensors 351D-2 to 351D-10 have the same configuration as the light shielding sensor 351D-1, except their arrangement positions, pitch, and orientations.

In the present embodiment, the backlight light shielding electrodes 614P-1 to 614P-6 of the light receiving sensors 351P-1 to 351P-6 are connected with the same electric potential VVSH (=5 V) as the cathodes. On the other hand, the backlight light shielding electrodes 614D-1 to 614D-6 of the light shielding sensors 350D-1 to 350D-6 are connected with an electric potential VVCHG (=2.0 V), and is applied with the same electric potential as the cathodes immediately after a signal RST is shifted from High (5 V) to Low (0 V) and is applied with an electric potential 0.5 V lower than the electric potential of the cathodes because the electric potentials of the cathodes are increased to 2.5 V at the time when an electric potential output to the wiring OUT is shifted from Low (0 V) to High (5 V).

Figure 24:
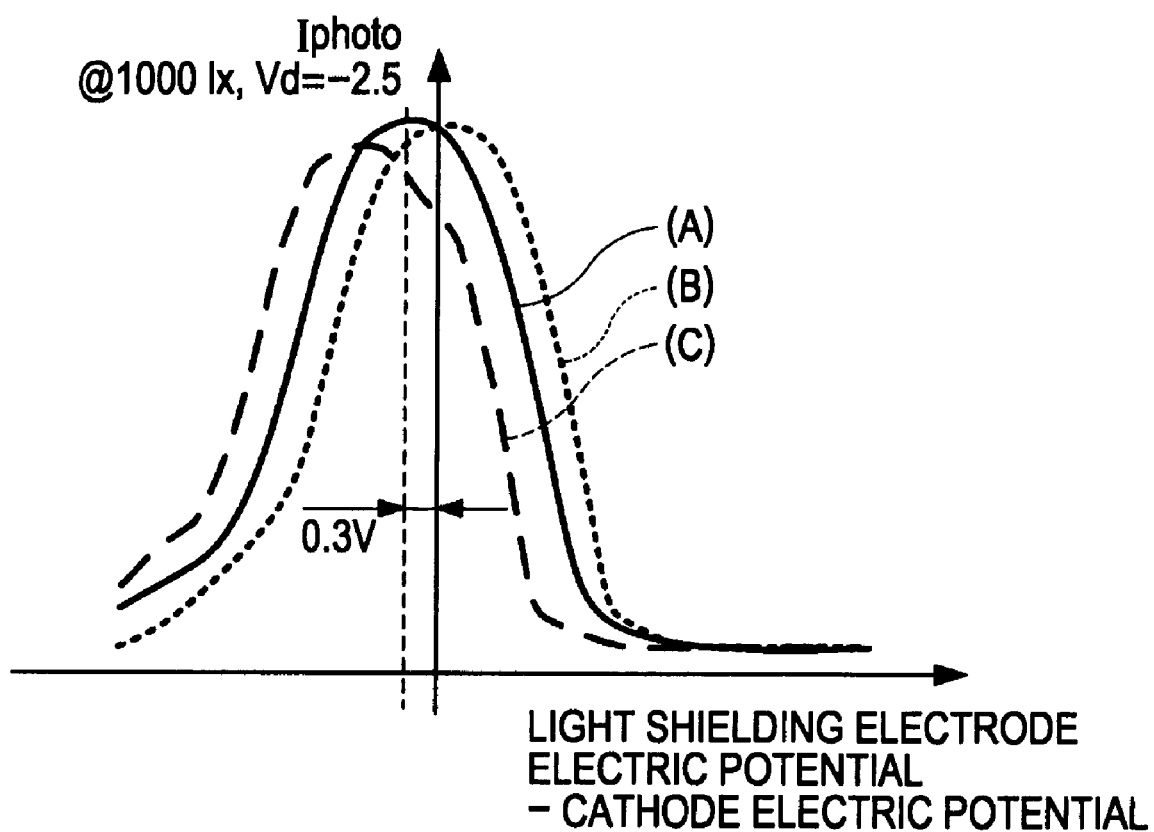
FIG. 24 is a graph of an electric current of a PIN diode and an electric potential between a light shielding electrode and a cathode electrode according to the second embodiment of the invention.

FIG. 24 is a graph that shows the characteristics of diodes forming the light receiving sensors 351P-1 to 351P-6 and the light shielding sensors 351D-1 to 351D-6, in which the abscissa axis represents a difference in electric potential between a light shielding electrode and a cathode electrode, and the ordinate axis represents an electric current that flows between the anode and cathode of the PIN diode under the conditions that the temperature is 23° C., the bias Vd is −2.5 V, and ambient light has 1000 lux. The graph shown in FIG. 24 is alternative to the graph shown in FIG. 15 of the first embodiment. The solid line (A) is the result of a sample, of which a voltage value in the abscissa axis at a peak electric current, that indicates a median among a plurality of samples measured. Similarly, the dotted line (B) is the result of a sample, of which a voltage value in the abscissa axis at a peak electric current, that indicates a maximum value among the plurality of samples measured. Similarly, the broken line (C) is the result of a sample, of which a voltage value in the abscissa axis at a peak electric current, that indicates a minimum value among the plurality of samples measured. In comparison with those of the first embodiment, in the present embodiment, there is a small difference among the solid line (A), the dotted line (B) and the broken line (C) and, therefore, it is applicable even when a difference in electric potential between the light shielding electrode and the cathode electrode is fixed to 0 to 0.5 V. According to the above configuration, in comparison with the configuration of the first embodiment, it is advantageous in that the number of elements and the number of wirings may be reduced. In addition, in the configuration of the present embodiment, because the electric potentials of the backlight light shielding electrode 614P-1 and the backlight light shielding electrode 614D-1 are connected with a power of the external power supply circuit, an output impedance decreases as compared with they are connected to the self-correction voltage circuit 361 as in the case of the first embodiment. Thus, it is advantageous in that shielding performance against electromagnetic noise is improved. Whether to provide the self-correction voltage circuit as in the case of the first embodiment or to apply a fixed electric potential to a light shielding layer without providing a self-correction voltage circuit as in the case of the present embodiment may be determined by measuring tolerance in a manufacturing process.

In addition, in the present embodiment, the transparent electrode 615 overlaps both the light shielding sensors 351D-1 to 351D-6 and the light receiving sensors 351P-1 to 351P-6, and is applied with the same electric potential (common electric potential). In the present embodiment, a capacitance per unit area between the backlight light shielding electrode 614P-1 and the light receiving portion 351P-1I, which serves as a light receiving layer, and a capacitance per unit area between the backlight light shielding electrode 614D-1 and the light receiving portion 351D-1I, which serves as a light receiving layer, are 222 μF/μm², and a capacitance per unit area between the transparent electrode 615 and the light receiving portion 351P-1I, which serves as a light receiving layer, and a capacitance per unit area between the transparent electrode 615 and the light receiving portion 351D-1I which serves as a light receiving layer, are 18 μF/μm². Thus, the influence of electric potential on the light receiving layers are 12 times or larger in the backlight light shielding electrode 614P-1 or in the backlight light shielding electrode 614D-1 than in the transparent electrode 615. For example, the influence when an electric potential of the backlight light shielding electrode 614P-1 or the backlight light shielding electrode 614D-1 is varied 1 V is equal to the influence when an electric potential of the transparent electrode 615 is varied 12 V.

In the present embodiment, a difference in electric potential between the electric potential of the transparent electrode 615 and the cathode region 351P-1N of the light receiving sensor 351P-1 is −1.0 V, and a difference in electric potential between the electric potential of the transparent electrode 615 and the cathode region 351D-1N of the light shielding sensor 351D-1 is +2.0 to 2.5 V. Thus, there is a difference up to 3.5 V; however, when this is converted into the electric potential of the backlight light shielding electrode, it is just about a difference of 0.3 V, which may be ignored. Thus, when a plurality of electrodes overlap the light receiving layer in plan view, if an electric potential of the electrode that has a greater capacitance per unit area with the light receiving layer is optimized, it is not necessary to optimize an electric potential of the electrode that has a smaller capacitance per unit area with the light receiving layer. In the present embodiment, the transparent electrode 614 is used as one large electrode that overlaps the light shielding sensors 351D-1 to 351D-6 and the light receiving sensors 351P-1 to 351P-6. By connecting the transparent electrode 614 to a common electric potential power supply that has a low output impedance, the shielding performance for the light shielding sensors 351D-1 to 351D-6 and the light receiving sensors 351P-1 to 351P-6 against electromagnetic noise is improved.

Note that the embodiments described above are illustrative in all respects and are not intended to limit the scope of the invention. The scope of the invention is given not by the above described embodiments but by the scope of claims. The scope of the invention encompasses any modifications within the scope of the claims and equivalents thereto.

For example, in the present embodiment, the transparent electrode 614 is connected to the common potential wiring 335; however, another wiring may be used as long as the wiring has a relatively low output impedance. For example, the transparent electrode 614 may be connected to the wiring VSL that is connected to the GND of the liquid crystal display device 910.

In regard to the embodiment of the liquid crystal display device that uses the active matrix substrate 101B, the active matrix substrate 101 of the liquid crystal display device 910 shown in FIG. 1 of the first embodiment is only replaced by the active matrix substrate 101B, so that the description thereof is omitted. In addition, in regard to the electronic apparatus that uses the liquid crystal display device 910 as well, it is what it is described with reference to FIG. 4 of the first embodiment, so that the description thereof is omitted. The sizes of the light receiving opening portions 991-1 to 991-6 are 10 mm, which is the same as in the case of the first embodiment, in a direction (hereinafter, referred to as X direction) parallel to the boundary side of the peripheral portion of the display area 310, at which the light receiving opening portions 990-1 to 990-6 are arranged. On the other hand, the sizes of the light receiving opening portions 991-7 to 991-10 in the X direction are 7 mm, which is shortened in consideration that the side is in proximity to the backlight unit 926 and, therefore, has a large thermal gradient. In response to this, the light receiving opening portions 991-1 to 991-6 are arranged at a pitch of 20 mm, and the light receiving opening portions 991-7 to 991-10 are arranged at a pitch of 14 mm.

In regard to a direction (hereinafter, referred to as Y direction) perpendicular to the boundary side of the display area 310, the thickness of the opposite substrate 912B is 0.25 mm. If the sizes of the light receiving opening portions 991-1 to 991-10 are 0.3 mm which is the same as in the case of the first embodiment, stray light will increase and, as a result, measurement accuracy decreases. For this reason, the sizes of the light receiving opening portions 991-1 to 991-10 all are set to 0.2 mm in the Y direction.

When the light receiving sensors are arranged at a plurality of sides as in the present embodiment, the influence of a finger or small shadow may be further removed, and, hence, it is more and more preferable. However, because of the positional relationship with a light source, it is necessary to consider thermal gradient. In the present embodiment, the light receiving sensors are arranged at two sides; however, they may be, of course, arranged at three or four sides. In addition, in the present embodiment, the pitch of the sensors and the size of the opening portions are varied depending on the sides arranged; however, when the thermal gradient is remarkably uneven in the same side, the pitch of the sensors and the size of the opening portions may be varied in the same side.

Figure 25:
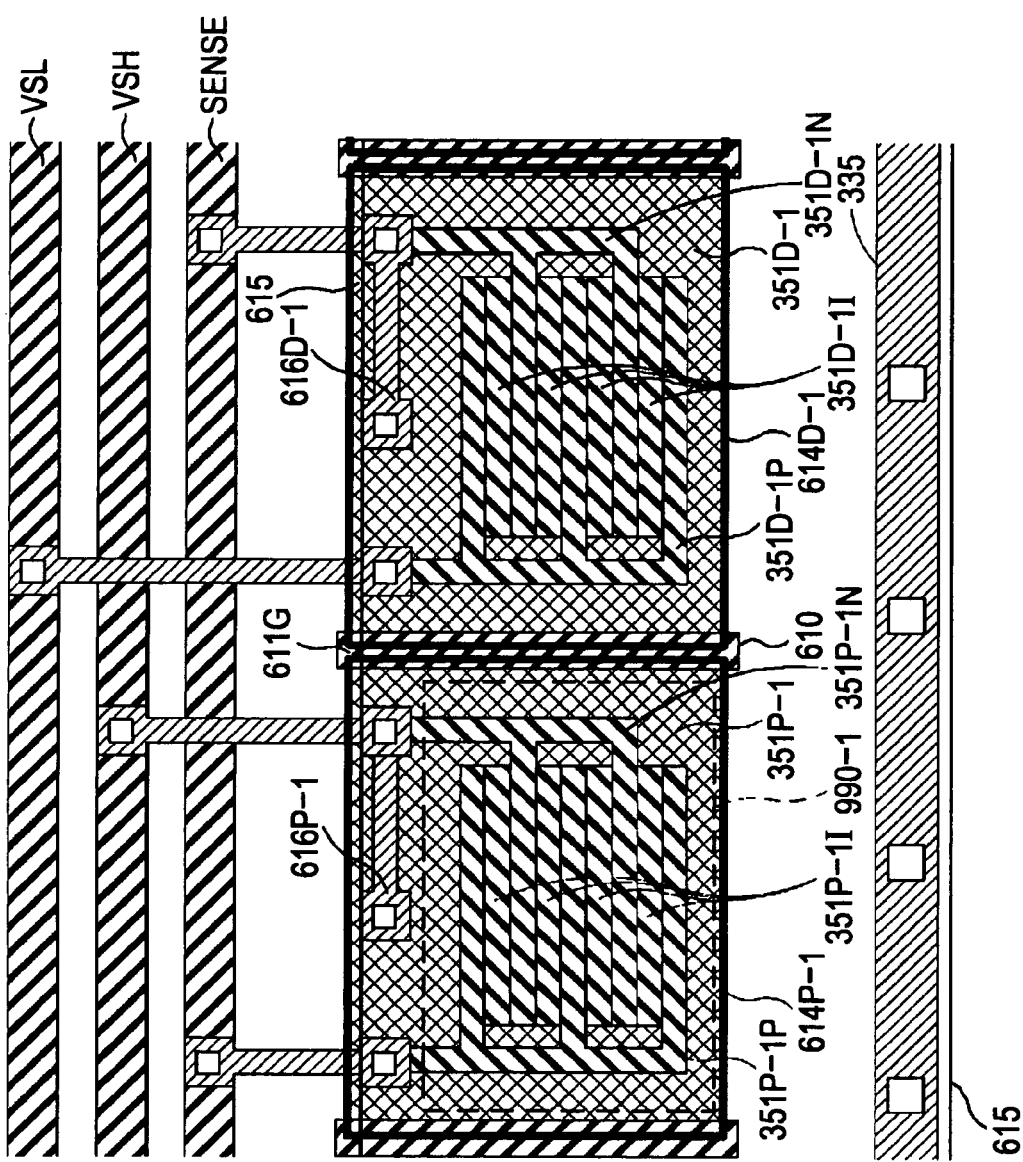
FIG. 25 is a plan view of a light receiving sensor and a light shielding sensor according to another configuration example of the second embodiment of the invention.

Note that, in the present embodiment, the intermediate electrodes 616D-1 to 616D-6 may be connected to the cathode region 351D-1N to 351D-6N, which serve as cathode regions, and the intermediate electrodes 616P-1 to 616P-6 may be connected to the cathode regions 351P-1N to 351P-6N, which serve as cathode electrodes, and then the wiring VCHG may be omitted. FIG. 25 is another plan view of the light receiving sensor 351P-1 and the light shielding sensor 351D-1 when they are configured as described above. As configured above, because a difference in electric potential between the backlight light shielding electrodes 614P-1 to 614P-6 and the cathode regions 351P-1N to 351P-6N and a difference in electric potential between the backlight light shielding electrodes 614D-1 to 614D-6 and the cathode regions 351D-1N to 351D-6N are always 0 V, it is advantageous in that the amount of thermoelectric current Ileak that flows through the light receiving sensors 351P-1 to 351P-6 and the light shielding sensors 351D-1 to 351D-6 are always constant, whereas it is disadvantageous in that, because the backlight light shielding electrode 614D-1 is connected to the wiring SENSE, the wiring SENSE in a floating state, in which the wiring SENSE is not connected to an electric potential, when the electric potential of the wiring RST is Low (0 V), it is easily influenced by electromagnetic noise. Which to select may be determined on the basis of evaluation of the influence of electromagnetic noise, or the like.

INDUSTRIAL APPLICABILITY

The aspects of the invention are not limited to the embodiments described above, but the aspects of the invention may be applied to a liquid crystal display device, such as a vertical alignment mode (VA mode), an IPS mode that uses lateral electric field, or an FFS mode that uses fringe electric field, other than a TN mode. In addition, the liquid crystal display device may be not only of a transmissive type but also of a reflective type or a transflective type. In addition, the aspects of the invention may be applied not to the liquid crystal display device but to an organic EL display, a field emission display, or a semiconductor device other than the liquid crystal display device.

In addition, the aspects of the invention may be applied to a display device that not only controls a display luminance in response to ambient light as described in the present embodiment but also measures an illuminance or chromaticity of the display device and then uses them for feedback to eliminate chrominance non-uniformity and aged deterioration.

What is claimed is:

1. An electro-optical device comprising:
   a panel that is formed so that an electro-optical material is held between a first substrate and a second substrate;
   a lighting unit that irradiates light to a surface of the first substrate or the second substrate of the panel;
   a light detecting portion that detects an illuminance of ambient light; and a light control portion that controls the lighting unit on the basis of result detected by the light detecting portion, wherein
the light detecting portion is provided on the first substrate or on the second substrate, wherein the light detecting portion includes:
a first optical sensor that is irradiated with ambient light;
a second optical sensor that is shielded against irradiation of ambient light;
a first electrode that is configured to overlap the first optical sensor through an insulating layer in plan view;
a second electrode that is configured to overlap the second optical sensor through an insulating layer in plan view; and
an electric potential applying portion that controls an electric potential of the first electrode and an electric potential of the second electrode, wherein
the first and second optical sensors are photodiodes, and
where a difference in electric potential between a cathode electrode of the first optical sensor and the first electrode is V1, a difference in electric potential between the cathode electrode of the first optical sensor and an anode electrode of the first optical sensor is VD1, a difference in electric potential between a cathode electrode of the second optical sensor and the second electrode is V2, and a difference in electric potential between the cathode electrode of the second optical sensor and an anode electrode of the second optical sensor is VD2, |V1−V2|<|VD1| and |V1−V2|<|VD2| is established and/or |V1−V2|<1 V is established.

2. The electro-optical device according to claim 1, wherein the electric potential applying portion controls the electric potential of the first electrode and/or the electric potential of the second electrode so that the amount of photoelectric current of the first optical sensor and/or the amount of photoelectric current of the second optical sensor becomes substantially a maximum value.

3. The electro-optical device according to claim 2, wherein one of the first substrate and the second substrate includes a transistor formed thereon, and wherein
the electric potential applying portion controls the electric potential applied to the first electrode and/or the electric potential applied to the second electrode on the basis of a threshold voltage of the transistor.

4. A semiconductor device formed on a substrate, comprising:
a first optical sensor that is irradiated with ambient light;
a second optical sensor that is shielded against irradiation of ambient light;
a first electrode that is configured to overlap the first optical sensor in plan view;
a second electrode that is configured to overlap the second optical sensor in plan view; and
an electric potential applying portion that controls an electric potential of the first electrode and an electric potential of the second electrode, wherein
the first optical sensor is a photodiode and the second optical sensor is a photodiode, and
where a difference in electric potential between a cathode electrode of the first optical sensor and the first electrode is V1, a difference in electric potential between the cathode electrode of the first optical sensor and an anode electrode of the first optical sensor is VD1, a difference in electric potential between a cathode electrode of the second optical sensor and the second electrode is V2, and a difference in electric potential between the cathode electrode of the second optical sensor and an anode electrode of the second optical sensor is VD2, |V1−V2|<|VD1| and |V1−V2|<|VD2| is established and/or |V1−V2|<1 V is established.

5. The semiconductor device according to claim 4, wherein the difference in electric potential V1 is set to V1=0 V, and/or the difference in electric potential V2 is set to V2=0 V, and/or the difference in electric potential V1 and the difference in electric potential VD1 are set to V1=VD1, and/or the difference in electric potential V2 and the difference in electric potential VD2 are set to V2=VD2.

6. The semiconductor device according to claim 4, wherein
the first electrode is a first light shielding electrode that shields light and the second electrode is a second light shielding electrode that shields light, or
the first electrode is a first transparent electrode that does not shield light and the second electrode is a second transparent electrode that does not shield light, or
the first electrode is a first light shielding electrode that shields light and a first transparent electrode that does not shield light and the second electrode is a second light shielding electrode that shields light and a second transparent electrode that does not shield light.

7. The semiconductor device according to claim 6, wherein
the first light shielding electrode and the second light shielding electrode form a light shielding electrode gap region in between, in which no light shielding electrode is formed in the light shielding electrode gap region, and wherein
an opaque gap light shielding body is formed in a region that overlaps the light shielding electrode gap region.

8. The semiconductor device according to claim 6, wherein
the first light shielding electrode and the second light shielding electrode form a light shielding electrode gap region in between, in which no light shielding electrode is formed in the light shielding electrode gap region, wherein
the first transparent electrode and the second transparent electrode form a transparent electrode gap region in between, in which no transparent electrode is formed in the transparent electrode gap region, and wherein
the light shielding electrode gap region and the transparent electrode gap region are formed so as not to overlap each other in a vertical direction of the substrate.

9. The semiconductor device according to claim 6, wherein
the first light shielding electrode and the first transparent electrode are applied with the same electric potential, and
the second light shielding electrode and the second transparent electrode are applied with the same electric potential.

10. The semiconductor device according to claim 4, wherein
the electric potential applying portion is provided with a self-correction voltage circuit formed of a transistor, wherein
the self-correction voltage circuit is configured to output a voltage, which varies in response to a threshold value of the transistor, to the first electrode and/or the second electrode.

11. The semiconductor device according to claim 4, wherein the first optical sensor and the second optical sensor each are a PIN junction diode or PN junction diode that uses thin-film polysilicon.

12. A display device comprising the semiconductor device according to claim 4.

13. The electro-optical device according to claim 1, wherein a display area is formed in the panel, the light detecting portion is provided at a peripheral portion of the display area and the light detecting portion includes:

a plurality of first optical sensors and a plurality of second optical sensors arranged at the peripheral portion of the display area.

14. The electro-optical device according to claim 13, further comprising:

a light source that irradiates light to the display area of the panel, wherein the light source is arranged at a side of the peripheral portion of the display area, at which the first optical sensors and the second optical sensors are not arranged.

15. The electro-optical device according to claim 13, wherein the first optical sensors and the second optical sensors are alternately arranged with each other.

16. The electro-optical device according to claim 13, wherein the first optical sensors and the second optical sensors that are arranged adjacent to the first optical sensors are located substantially the same distance from the boundary side of the display area.

17. The electro-optical device according to claim 13, wherein the size of a plurality of opening portions, which are provided in the first substrate or in the second substrate to irradiate ambient light around the panel to the first optical sensors is set to a range of 0.5 mm to 20 mm in a direction parallel to the boundary side of the peripheral portion of the display area, at which the opening portions are arranged, and to a range of 0.05 mm to a thickness of the substrate, which is provided with the opening portions, in a direction perpendicular to the boundary side of the peripheral portion of the display area, at which the opening portions are arranged.

18. The electro-optical device according to claim 17, wherein the plurality of opening portions include, at the peripheral portion of the display area, at least one first opening portion that is arranged at a side opposite an arranged side at which the light source is arranged and at least one second opening portion that is arranged at a side that is substantially perpendicular to the arranged side, and wherein an area of opening of the at least one first opening portion is greater than an area of opening of the at least one second opening portion.

19. An electronic apparatus comprising the electro-optical device according to claim 13.

* * * * *